US012273823B2

(12) United States Patent
Bhutani et al.

(10) Patent No.: US 12,273,823 B2
(45) Date of Patent: *Apr. 8, 2025

(54) CONTROL DEVICE HAVING AN ADAPTIVE TRANSMIT POWER

(71) Applicant: Lutron Technology Company LLC, Coopersburg, PA (US)

(72) Inventors: Ankit Bhutani, Aston, PA (US); Richard S. Camden, Coopersburg, PA (US); Kaiming Li, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 289 days.

This patent is subject to a terminal disclaimer.

(21) Appl. No.: 17/825,180

(22) Filed: May 26, 2022

(65) Prior Publication Data

US 2022/0286976 A1 Sep. 8, 2022

Related U.S. Application Data

(63) Continuation of application No. 16/852,245, filed on Apr. 17, 2020, now Pat. No. 11,388,677.
(Continued)

(51) Int. Cl.
*H04B 7/00* (2006.01)
*H04L 1/18* (2023.01)
(Continued)

(52) U.S. Cl.
CPC ............. *H04W 52/228* (2013.01); *H04L 1/18* (2013.01); *H04L 12/2803* (2013.01); *H05B 47/19* (2020.01); *H04L 2012/2841* (2013.01)

(58) Field of Classification Search
CPC ......... H04W 52/0267; H04W 52/0274; H04W 52/028; H04W 52/228; H04W 52/367; H05B 47/19; H05B 45/10; H05B 47/11
See application file for complete search history.

(56) References Cited

U.S. PATENT DOCUMENTS 5,248,919 A  9/1993 Hanna et al.
5,838,226 A  11/1998 Houggy et al.
(Continued)

FOREIGN PATENT DOCUMENTS

CN  101558687 A  10/2009
CN  102388678 A  3/2012
(Continued)

*Primary Examiner* — Tuan Pham
(74) *Attorney, Agent, or Firm* — Flaster Greenberg, PC

(57) ABSTRACT

A control device may be configured to transmit messages using an adaptive transmit power. The control device may determine a transmit power for transmitting the message based on a command in the message. The control device may determine a transmit power based on a change in lighting intensity caused by the command. The transmit power may be greater when the change in lighting intensity is above a threshold than when the change in light intensity is below the threshold. The control device may determine whether the message was successfully received based on the receipt of an acknowledgement message. The control device may increase the transmit power when the message fails to be received and retransmit the message including the command at an increased transmit power. The control device may store (e.g., learn) the increased transmit power for later use.

20 Claims, 14 Drawing Sheets

Related U.S. Application Data

(60) Provisional application No. 62/836,348, filed on Apr. 19, 2019.

(51) Int. Cl.
*H04L 12/28* (2006.01)
*H04W 52/22* (2009.01)
*H05B 47/19* (2020.01)

(56) References Cited

U.S. PATENT DOCUMENTS

| | | |
|---|---|---|
| 5,848,054 A | 12/1998 | Mosebrook et al. |
| 5,905,442 A | 5/1999 | Mosebrook et al. |
| 6,369,693 B1 | 4/2002 | Gibson |
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,330,638 B2 | 12/2012 | Altonen et al. |
| 8,410,706 B2 | 4/2013 | Steiner et al. |
| 8,451,116 B2 | 5/2013 | Steiner et al. |
| 8,471,779 B2 | 6/2013 | Mosebrook |
| 8,950,461 B2 | 2/2015 | Ogden et al. |
| 9,115,537 B2 | 8/2015 | Blair |
| 9,368,025 B2 | 6/2016 | Carmen |
| 9,553,451 B2 | 1/2017 | Zacharchuk et al. |
| 9,679,696 B2 | 6/2017 | Bhutani et al. |
| 10,027,127 B2 | 7/2018 | Crafts et al. |
| 10,271,407 B2 | 4/2019 | Pessina et al. |
| 10,701,786 B2 * | 6/2020 | Recker ............... H02J 9/065 |
| 11,388,677 B2 * | 7/2022 | Bhutani ............... H04W 52/367 |
| 2004/0088086 A1 | 5/2004 | Horst |
| 2006/0238314 A1 | 10/2006 | Minassian et al. |
| 2008/0111491 A1 | 5/2008 | Spira et al. |
| 2009/0206983 A1 | 8/2009 | Knode et al. |
| 2012/0025717 A1 | 2/2012 | Klusmann et al. |
| 2012/0056712 A1 | 3/2012 | Knode |
| 2012/0286940 A1 | 11/2012 | Carmen et al. |
| 2013/0030589 A1 | 1/2013 | Pessina et al. |
| 2014/0001977 A1 | 1/2014 | Zacharchuk et al. |
| 2014/0175875 A1 | 6/2014 | Newman et al. |
| 2014/0177469 A1 | 6/2014 | Neyhart et al. |
| 2014/0180487 A1 | 6/2014 | Bull et al. |
| 2015/0179058 A1 | 6/2015 | Crafts et al. |
| 2015/0295411 A1 | 10/2015 | Gill et al. |
| 2017/0200465 A1 | 7/2017 | Bostick et al. |
| 2017/0222968 A1 * | 8/2017 | Li ............... H04W 4/12 |
| 2018/0014387 A1 | 1/2018 | Bard et al. |
| 2018/0027631 A1 | 1/2018 | Turvy, Jr. et al. |
| 2018/0035519 A1 | 2/2018 | Turvy et al. |
| 2018/0070427 A1 * | 3/2018 | Taipale ............... H05B 47/105 |
| 2018/0114434 A1 | 4/2018 | Newman, Jr. et al. |
| 2018/0116040 A1 | 4/2018 | Mann et al. |
| 2019/0053356 A1 | 2/2019 | Hiramatsu et al. |

FOREIGN PATENT DOCUMENTS

| | | |
|---|---|---|
| CN | 106416429 A | 2/2017 |
| WO | 2017200465 A1 | 11/2017 |

* cited by examiner

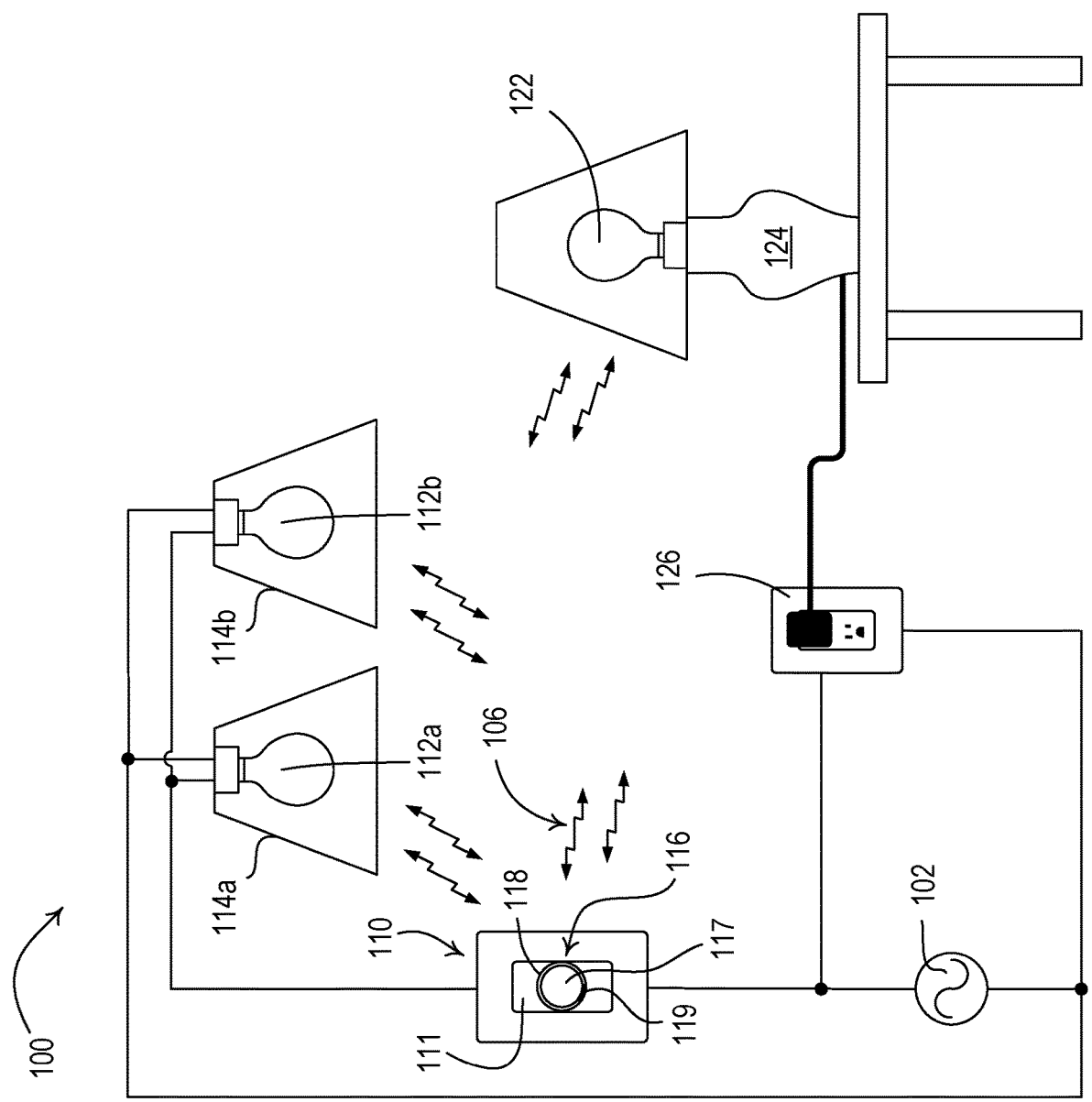

CONTROL DEVICE HAVING AN ADAPTIVE TRANSMIT POWER

CROSS-REFERENCE TO RELATED APPLICATIONS

This application is a continuation of U.S. Non-Provisional patent application Ser. No. 16/852,245, filed Apr. 17, 2020 and claims the benefit of U.S. Provisional Patent Application No. 62/836,348, filed Apr. 19, 2019, the disclosure of which are both incorporated herein by reference in their entireties.

BACKGROUND

A user environment, such as a residence or an office building, for example, may be configured using various types of load control systems. A lighting control system may be used to control the lighting loads in a user environment. The lighting control system may include various devices, such as input devices and load control devices, capable of communicating via radio frequency (RF) communications. For example, a remote control device (e.g., an input device) may be used to communicate with lighting devices (e.g., light bulbs) in the load control system to control a lighting level (e.g., intensity) of the lighting devices. The devices may communicate in a network using RF communications, such as ZIGBEE® communications; BLUETOOTH® communications; or proprietary communications, such as CLEAR CONNECT™.

Lighting devices in the user environment may be collectively controlled by a common lighting control device that is capable of dimming the group of lighting devices or toggling the group of lighting devices on and off. The common lighting control device may be mobile (e.g., may not be placed in a fixed location) and may be battery powered. Communicating over RF may consume a finite power source of the common lighting control device. RF communications may be performed inefficiently, for example, by using a static transmission power, which may not consider the mobility of the common lighting control device. Accordingly, if communication over RF is not efficiently performed, the battery of the common control device may often deplete. A user of the common lighting control device may continually replace the battery, which may result in a poor user experience.

The common lighting control device may asynchronously control the lighting devices over RF. For example, the common lighting control device may not transmit commands periodically. Rather, the common lighting control device may transmit commands in response to user inputs (e.g., user interactions), which may occur unexpectedly (e.g., asynchronously). Further, as the lighting control device may be mobile, the location of the lighting control device relative to the lighting device may change over a single user input and/or between distinct user inputs. Accordingly, the environmental conditions of communication over RF may not be consistent. However, certain characteristics of the RF communications (e.g., transmit power) may remain static, which may result in unsuccessful or inefficient RF communications.

A common lighting control device may control multiple lighting devices, for example, by transmitting a command to each of the lighting devices. However, one or more the lighting device may fail to receive the command. The lighting devices that fail to receive the command may become out of sync with the other lighting devices controlled by the common lighting control device (e.g., the lighting devices that receive the command), the effects of which may be noticeable. Further, the effects of when certain commands are not received may be more noticeable than the effects of when other commands are not received (e.g., on/off commands may be more noticeable that raise or lower commands).

SUMMARY

A remote control device may be configured to transmit messages for controlling a lighting device using a variable (e.g., adaptive) transmit power. The remote control device may receive a user input, for example, via a user interface. The remote control device may determine a command from a plurality of command types. (e.g., on command, off command, toggle command, raise command, lower command, an amount to raise/lower, a level to go to, a move-to-level command, a move-to-level-with-rate command, a move-with-fade command, a preset command, etc.) based on the user input. The remote control device may determine a transmit power for transmitting a message including the command based on the command type. For example, the remote control device may determine the transmit power based on the change in lighting level caused by the command. The remote control device may transmit the message including the command to adjust the lighting level of a lighting load.

The remote control device may be configured to adjust the transmit power for transmission of a message including a command. The remote control device may determine a first transmit power for transmitting the message including the command. The remote control device may transmit the message including the command at the first transmit power. The remote control device may determine whether the message including the command is received (e.g., based on receiving an acknowledgment in response to the message including the command). The remote control device may determine a second transmit power when the message including the command fails to be received. For example, the second transmit power may be an increased transmit power relative to the first transmit power.

The remote control device may determine the initial transmit power for transmitting a message including a command based on the command type. The remote control device may determine the change in lighting level caused by the command. The remote control device may compare the change in lighting level to a threshold. When the change in lighting level is greater than the threshold, the remote control device may set the transmit power to a maximum transmit power. When the change in lighting level is lower than the threshold, the remote control device may set the transmit power to a minimum transmit power.

A remote control device may be configured to determine a transmit power for transmitting a message including a command based on the command type. The remote control device may receive a user input, for example, via a user interface. The remote control device may determine a command based on the user input. For example, the command may include control instructions (e.g., that may indicate a change in lighting intensity) to control a lighting load. The remote control device may determine a first transmit power based on the amount of change in lighting intensity caused by the command. For example, the first transmit power may be a maximum transmit power when the change in lighting intensity caused by the command is above a threshold. Also, or alternatively, the first transmit power may be a minimum transmit power when the change in lighting intensity caused by the command is below the threshold. The remote control device may transmit the command in a message at the first transmit power. The remote control device may determine whether the message including the command was successfully received, for example, based on an acknowledgement message. For example, the remote control device may determine that the message including the command was successfully received when the acknowledgment message is received. Similarly, the remote control device may determine that the message including the command failed to be received when an acknowledgment message is not received. The remote control device may increase the first transmit power to a second transmit power when the message including the command fails to be received and retransmit the message including the command.

After the remote control device has stored a transmit power for transmitting messages to other control devices, the remote control device may update the stored transmit power $P_{STORED}$. For example, the remote control device may update the stored transmit power $P_{STORED}$ to mitigate battery usage at the control device and/or to increase the likelihood of successful communications in response to changes in network conditions (e.g., to account for changes in distance, interference, and/or channel conditions). The remote control device may update the stored transmit power $P_{STORED}$ for transmitting communications during a learning procedure. During the learning procedure, the remote control device may increase or decrease a learned transmit power to identify the updated transmit power for being stored at the remote control device.

A remote control device may learn a transmit power at which to efficiently transmit messages including a command. The remote control device may receive a user input, for example, via a user interface. The remote control device may determine a command having a defined command type based on the user input. The remote control device may determine a transmit power for transmitting the command based on the amount of change in lighting intensity caused by the command type. For example, the transmit power for a message may be a first transmit power when the change in lighting intensity caused by the command type is above a threshold. The transmit power may be a second transmit power when the change in lighting intensity caused by the command type is below the threshold. The remote control device may transmit the command in a message at the determined transmit power.

The remote control device may learn to adjust the transmit power based on a test transmit power and identification of whether the message transmitted at the test transmit power has been successfully received. The remote control device may determine whether the message including the command was successfully received based on receipt of an acknowledgement message. The remote control device may set the test transmit power and continue to reduce the test transmit power while the remote control device continues to receive acknowledgement messages. When the remote control device fails to receive an acknowledgement message in response to a message transmitted at the test transmit power, the remote control device may store the test transmit power for which an acknowledgement was previously received as the transmit power for transmitting future messages.

The remote control device may fail to receive an acknowledgement message in response to a message transmitted at the test transmit power and increase the test transmit power until an acknowledgement is received. The remote control device may store the test transmit power for which an acknowledgement was received as the transmit power for transmitting future messages.

BRIEF DESCRIPTION OF THE DRAWINGS

FIGS. 1A and 1B depict examples of a load control system that may implement one or more message types for communicating messages.

DETAILED DESCRIPTION

Figure 1B:
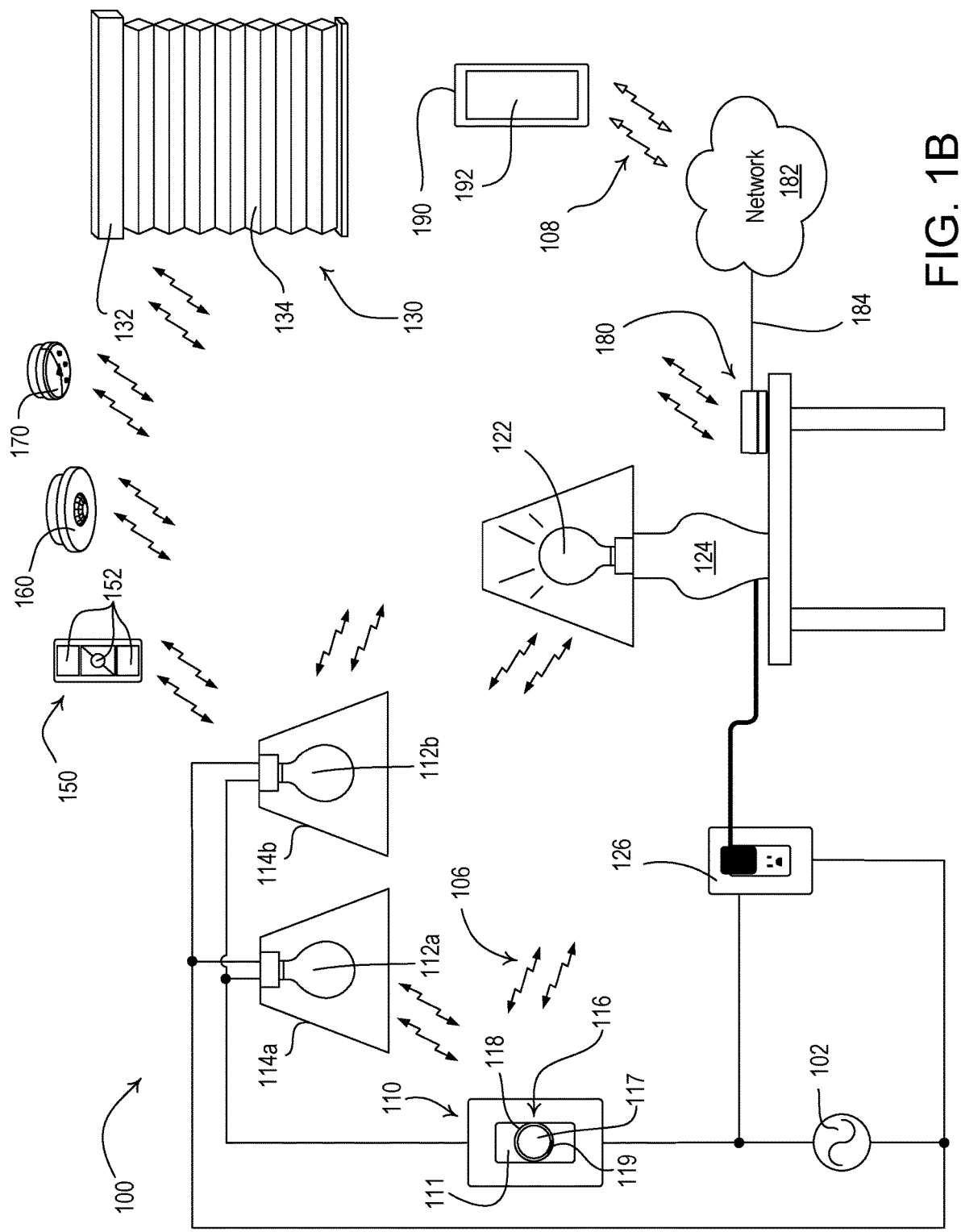

FIGS. 1A and 1B depict examples of a load control system 100 that may implement one or more message types for communicating messages (e.g., digital messages). As shown in FIG. 1A, the load control system 100 may include various control devices, such as controller devices and/or load control devices. The controller device may send messages to the load control device to cause the load control device to control an amount of power provided from an AC power source 102 to an electric load in the load control system 100.

Load control devices may control the electrical loads within a room and/or a building. Each load control device may be capable of directly controlling the amount of power provided to an electrical load in response to communication from a controller device. Example load control devices may include lighting devices 112a, 112b and/or lighting device 122 (e.g., a load control device in light bulbs, ballasts, light-emitting diode (LED) drivers, etc.). The lighting devices may be a lighting load itself, or a device that includes the lighting load and a lighting load controller.

A controller device may indirectly control the amount of power provided to an electrical load by transmitting messages to the load control device. The messages may include control instructions (e.g., load control instructions) or another indication that causes the load control device to determine load control instructions for controlling an electrical load. Example controller devices may include a remote control device 116. The controller devices may include a wired or wireless device.

Control devices (e.g., controller devices and/or load control devices) may communicate with each other and/or other devices via wired and/or wireless communications. The control devices may communicate using messages in a wireless signal. For example, the control devices may communicate via radio frequency (RF) signals 106. The RF signals 106 may be communicated via an RF communication protocol (e.g., ZIGBEE®; near field communication (NFC); BLUETOOTH®; BLUETOOTH® LOW ENERGY (BLE), WI-FI®; THREAD®; a proprietary communication protocol, such as CLEAR CONNECT™, CLEAR CON- NECT TYPE X™, etc.). The messages may be transmitted as multicast messages and/or unicast messages via the RF signals 106.

The lighting device 122 may be installed in a plug-in device 124, such as a lamp (e.g., a table lamp). The plug-in device 124 may be coupled in series electrical connection between the AC power source 102 and the lighting device 122. The plug-in device 124 may be plugged into an electrical receptacle 126 that is powered by the AC power source 102. The plug-in device 124 may be plugged into the electrical receptacle 126 or a separate plug-in load control device that is plugged into the electrical receptacle 126 and configured to control the power delivered to the lighting device 122.

The lighting devices 112a, 112b may be controlled by a wall-mounted load control device 110. Though the lighting devices 112a, 112b are shown in FIG. 1A, any number of lighting devices may be implemented that may be supported by the wall-mounted load control device 110 and/or the AC power source 102. The wall-mounted load control device 110 may be coupled in series electrical connection between the AC power source 102 and lighting devices 112a, 112b. The wall-mounted load control device 110 may include a mechanical switch 111 (e.g., a previously-installed light switch) that may be opened and closed in response to actuations of a toggle actuator (not shown) for controlling the power delivered from the AC power source 102 to the lighting devices 112a, 112b (e.g., for turning on and off the lighting devices 112a, 112b). The lighting devices 112a, 112b may be installed in respective ceiling mounted downlight fixtures 114a, 114b or other lighting fixture mounted to another surface. The wall-mounted load control device 110 may be adapted to be wall-mounted in a standard electrical wallbox.

The remote control device 116 may be configured to transmit messages via the RF signals 106 for controlling the lighting devices 112a, 112b. For example, the remote control device 116 may be configured to transmit messages via the RF signals 106 to load control devices (e.g., the lighting devices 112a, 112b) that are within a wireless communication range of the remote control device. The remote control device 116 may be battery-powered.

The remote control device 116 may be a retrofit remote control device mounted over the toggle actuator of the mechanical switch 111. The remote control device 116 may be configured to maintain the toggle actuator of the mechanical switch 111 in the "on" position (e.g., by covering the switch when in the "on" position) to maintain the flow of power from the AC power source 102 to the lighting devices 112a, 112b. In addition, the remote control device 116 may be mounted to another structure (e.g., other than the toggle actuator of the mechanical switch 111), such as wall, may be attached to a pedestal to be located on a horizontal surface, or may be handheld. Further, the wall-mounted load control device 110 may comprise a wall-mounted remote control device that replaces the previously-installed mechanical switch 111 and may be configured to operate as the remote control device 116 to control the lighting devices 112a, 112b (e.g., by transmitting messages via the RF signals 106). Such a wall-mounted remote control device may derive power from the AC power source 102.

The remote control device 116 may comprise an actuation portion 117 (e.g., a "toggle" button or actuator) that may be actuated (e.g., pushed in towards the mechanical switch 111) and a rotation portion 118 (e.g., a rotary knob) that may be rotated (e.g., with respect to the mechanical switch 111). The remote control device 116 may be configured to transmit messages including commands for turning the lighting devices 112a, 112b, 122 on and off in response to actuations (e.g., presses) of the actuation portion 117 and commands for adjusting an intensity (e.g., lighting level) of the lighting devices 112a, 112b, 122 in response to actuations (e.g., rotations) of the rotation portion 118. Though a rotation portion 118 is disclosed, the remote control device 116 may include another type of intensity adjustment actuator, such as a linear slider, an elongated touch sensitive actuator, a rocker switch, separate raise/lower actuators, or another form of intensity adjustment actuator. The remote control device 116 may also comprise a status indicator 119, which may be illuminated to provide feedback to the user. When the actuation portion 117 and/or the rotation portion 118 are actuated, the remote control device 116 may transmit messages via the RF signals 106 and illuminate the status indicator 119 for the length of a control event. The control event may last from when the actuation portion 117 and/or the rotation portion 118 are first actuated to start the control event until an amount of time (e.g., a few seconds) after the actuation of the actuation portion 117 and/or the rotation portion 118 stops. A single actuation of the actuation portion 117 may result in a short control event, while a continued rotation of the rotation portion 118 may result in a long control event.

The lighting devices 112a, 112b may be turned on or off, or the intensity level may be adjusted, in response to the remote control device 116 (e.g., in response to actuations of the actuation portion 117 of the remote control device 116). For example, the lighting devices 112a, 112b may be toggled on or off by a toggle event identified at the remote control device 116. The toggle event may be a user input identified at the remote control device 116. The actuation portion 117 of the remote control device 116 may be actuated to toggle the lighting devices 112a, 112b on or off. The rotation portion 118 of the remote control device 116 may be rotated to adjust the intensities of the lighting devices 112a, 112b. The toggle event may be identified when the rotation portion 118 of the remote control device 116 is turned by a predefined amount or for a predefined time, and/or the actuation portion 117 of the remote control device 116 is actuated. The lighting level of the lighting devices 112a, 112b may be increased or decreased by rotating the rotation portion 118 of the remote control device 116 in one direction or another, respectively. Though shown as comprising a rotary knob in FIGS. 1A and 1B, the remote control device 116 may comprise a paddle switch that may be actuated by a user, a linear control on which a user may swipe a finger, a raise/lower slider, a rocker switch, or another type of control capable of receiving user interface events as commands.

The remote control device 116 may transmit messages via the RF signals 106 to control the lighting devices 112a, 112b, 122. The remote control device 116 may be configured to transmit an on command for turning the lighting devices 112a, 112b, 122 on (e.g., an "on" event). For example, the on command may case the lighting devices 112a, 112b, 122 to turn on to a maximum intensity (e.g., 100%), to predetermined intensity, and/or to a previous intensity (e.g., an "on" event). In addition, the remote control device 116 may be configured to transmit an off command for turning the lighting devices 112a, 112b, 122 off (e.g., 0%). Further, the remote control device 116 may be configured to transmit a toggle command for toggling the state of the lighting devices 112a, 112b, 122 (e.g., causing the lighting devices to turn from off to on (e.g., an "on" event, or from on to off (e.g., an "off" event). For example, the remote control device 116 may be configured to transmit a toggle command in response to detecting a toggle event. The lighting level for the "on" event and/or the "off" event may also, or alternatively, be stored at the lighting devices 112a, 112b, 122 and the lighting devices may change to the lighting level upon receiving an indication of the occurrence of the "on" event or "off" event at the remote control device 116. The messages may cause an "on" event when the remote control device 116 is rotated a predefined distance or time in one direction. As an example, the remote control device 116 may transmit messages when the remote control device 116 is identified as being rotated for 100 milliseconds (ms). The messages may indicate an "off" event when the remote control device 116 is rotated a predefined distance or time in the opposite direction. The messages may indicate an "on" event or an "off" event when the actuation portion 117 of the remote control device 116 is actuated.

The remote control device 116 may be configured to adjust the intensities of the lighting devices 112a, 112b, 122 using absolute control in order to control the intensities of the lighting devices 112a, 112b, 122 to an absolute level (e.g., a specific level). For example, the remote control device 116 may transmit messages including a move-to-level command (e.g., a go-to-level or go-to command) that identifies a lighting level to which the lighting devices may change. The move-to-level command may include the amount of time over which the lighting level may be changed at the lighting devices. The move-to-level command may cause an "on" event or an "off" event to turn the lighting devices 112a, 112b, 122 on or off, respectively. For example, the "on" event may be caused by a move-to-level command with a 100% lighting level, or another preset lighting level. The "off" event may be caused by a move-to-level command with a 0% intensity level.

In response to a user interface event (e.g., actuation, rotation, finger swipe, etc.) or a proximity sensing event (e.g., a sensing circuit sensing an occupant near the remote control device 116) at the remote control device 116, the remote control device 116 may determine a starting point (e.g., a dynamic starting point) from which the lighting level of one or more of the lighting devices 112a, 112b, 122 may be controlled. Each rotation of the rotation portion 118 may cause the remote control device 116 to determine the dynamic starting point from which control may be performed. In response to the user interface event and/or a proximity sensing event (e.g., a sensing circuit sensing an occupant near the remote control device 116), the remote control device 116 may query the lighting devices 112a, 112b, 122 for a current status (e.g., after awakening from sleep mode). The current status of one or more of the lighting devices 112a, 112b, 122 may be used to set the dynamic starting point from which the remote control device 116 may perform control. For example, the remote control device 116 may set the dynamic starting point of the rotation portion 118 to the current intensity level (e.g., on, off, 10%, 20%, etc.) of the first of the lighting devices 112a, 112b, 122 to respond to the query, or a predefined lighting device 112a, 112b, 122.

In another example, the remote control device 116 may set the dynamic starting point of the rotation portion 118 based on the intensity level of multiple lighting devices 112a, 112b, 122. The remote control device 116 may set the dynamic starting point of the rotation portion 118 to an average intensity level (e.g., on, off, 10%, 20%, etc.) of the lighting devices 112a, 112b, 122, or a common lighting intensity (e.g., on, off, 10%, 20%, etc.) of a majority of the lighting devices 112a, 112b, 122, for example. The remote control device 116 may set the dynamic starting point of the rotation portion 118 to a maximum level of the lighting devices 112a, 112b, 122 when the rotation portion 118 is being rotated clockwise to raise the intensity level of the lighting devices, or a minimum level of the lighting devices 112a, 112b, 122 when the rotation portion 118 is being rotated counterclockwise to lower the intensity level of the lighting devices, for example. The status indicator 119 may be illuminated as feedback to reflect the dynamic starting point to the user. For example, the remote control device 116 may illuminate a portion of the status indicator 119 that reflects the lighting intensity that is set as the dynamic starting point.

The remote control device 116 may calculate an increase or decrease in intensity level from the dynamic starting point based on the user interface event. For example, the remote control device 116 may calculate an increase or decrease in intensity level based on the distance or amount of time the rotation portion 118 is turned. The rotation from the point of the initial interaction by the user with the rotation portion 118 may be used to identify the increase or decrease in intensity level from the dynamic starting point. When the remote control device 116 includes a linear control, the remote control device 116 may calculate an increase or decrease in intensity level based on the distance or amount of time the user swipes a finger up or down on the linear control. The user's finger swipe from the point of the initial interaction by the user with the linear control may be used to identify the increase or decrease in intensity level from the dynamic starting point.

The updated intensity level may be calculated from the user's initial interaction and stored at the remote control device 116. The updated intensity level may be included in a move-to-level command that is transmitted from the remote control device 116 to the lighting devices 112a, 112b, 122 when the remote control device 116 is using absolute control.

The remote control device 116 may transmit messages configured to increase the lighting level of the lighting devices 112a, 112b, 122 when the rotation portion 118 is rotated in a direction (e.g., clockwise). As previously mentioned, the remote control device 116 may be configured to adjust the intensities of the lighting devices 112a, 112b, 122 to an absolute level using absolute control. In addition, or alternatively, the remote control device 116 may be configured to adjust the intensities of the lighting devices 112a, 112b, 122 using relative control to adjust the intensities of the light devices 112a, 112b, 122 by a relative amount. For example, the remote control device 116 may transmit messages configured to decrease the lighting level of the lighting devices 112a, 112b, 122 when the remote control device 116 is rotated in the opposite direction (e.g., counterclockwise). The messages may include a move-with-rate command, which may cause the lighting devices 112a, 112b, 122 to change their respective intensity level by a predefined amount. The move-with-rate command may include an amount of time over which the lighting level may be changed at the lighting devices. The move-with-rate command may cause the lighting devices 112a, 112b, 122 to retain their relative or proportional intensity levels, and/or difference in respective intensity levels. The remote control device 116 may send messages to increase or decrease the lighting level by a predefined amount when rotated a predefined distance or for a predefined time. The amount of the increase or decrease may be indicated in the messages or may be predefined at the lighting devices 112a, 112b, 122. The messages may also include a move-to-level-with-rate command, which may include both a lighting level to which to control the lighting devices 112a, 112b, 122 and an amount of time over which the lighting level may be changed at the lighting devices.

The remote control device 116 may transmit messages that include move-with-rate commands to increase or decrease the lighting intensity level of the lighting devices 112a, 112b, 122 in predefined increments as the user turns the remote control device 116 a predefined distance or time in one direction or another. The remote control device 116 may continue to transmit messages to the lighting devices 112a, 112b, 122 as the user continues to turn the remote control device 116. For example, the remote control device 116 may identify a rotation of a predefined distance or for a predefined time and send one or more messages to instruct the lighting devices 112a, 112b, 122 to each increase by ten percent (10%). The remote control device 116 may identify a continued rotation of a predefined distance or time and send messages to instruct the lighting devices 112a, 112b, 122 to increase by ten percent (10%) again.

The remote control device 116 may also, or alternatively, send messages for a move-to-level command (e.g., "on" command, "off" command, toggle command, etc.) to turn on/off the lighting devices 112a, 112b, 122. The remote control device 116 may transmit one or more messages to the lighting devices 112a, 112b, 122 when an on event or an off event are detected. For example, the remote control device 116 may identify a rotation or actuation and send messages to instruct the lighting devices 112a, 112b, 122 to turn on/off. The remote control device 116 may operate by sending a move-with-rate command after turning on. For example, the remote control device 116 may identify a rotation of a predefined distance or time after turning on and send messages to instruct the lighting devices 112a, 112b, 122 to increase/decrease by a predefined intensity (e.g., ten percent (10%)).

The remote control device 116 may transmit the messages as multicast messages and/or unicast messages via the RF signal 106. For example, the messages including the move-with-rate command or the move-to-level command may be transmitted as unicast messages. Unicast messages may be sent from the remote control device 116 directly or via hops to each of the lighting devices 112a, 112b, 122. The remote control device 116 may individually send a unicast message to each of the lighting devices 112a, 112b, 122 with which the remote control device 116 is associated for performing load control. The remote control device 116 may have the unique identifier of each of the lighting devices 112a, 112b, 122 with which it is associated stored in memory. The remote control device 116 may generate a separate unicast message for each lighting device 112a, 112b, 122 and address the unicast messages to the lighting devices 112a, 112b, 122 independently. The unicast messages may also include the unique identifier of the remote control device 116. The lighting devices 112a, 112b, 122 may identify the unicast messages communicated to them by identifying their own unique identifier and/or a corresponding identifier of the remote that are stored in an association dataset. For example, the lighting devices 112a, 112b, 122 may each transmit an acknowledgement message to the remote control device 116 in response to receiving a unicast message from the remote control device. The lighting devices 112a, 112b, 122 may operate according to the instructions (e.g., load control instructions) in the messages comprising their own unique identifier and/or the unique identifier of an associated device, such as the remote control device 116.

The messages including the move-to-level command may be transmitted via the RF signals 106 as multicast messages. For example, the messages including an on command, an off command, a toggle command, and/or a move-to-level command that causes an "on" event or an "off" event may be transmitted as multicast messages. In addition, the messages including the move-to-level command that causes the lighting devices 112a, 112b, 122 to adjust their intensities by a large amount may be transmitted as multicast messages. The multicast messages may include a group identifier for controlling the lighting devices 112a, 112b, 122 that are a part of the multicast group. The lighting devices 112a, 112b, 122 may be a part of the multicast group when they are associated with the group identifier (e.g., by having the group identifier stored thereon) for recognizing multicast messages transmitted to the group. The lighting devices 112a, 112b, 122 that are associated with the group identifier may recognize the multicast messages and control the corresponding lighting load according to the command in the multicast messages. The lighting devices 112a, 112b, 122 may forward the multicast messages with the group identifier for identification and load control by other lighting devices associated with the group identifier.

The group may be formed at commissioning or configuration of the load control system 100. The remote control device 116 may generate the group identifier and send the group identifier to the lighting devices 112a, 112b, 122 and/or a system controller (e.g., a hub device) when the remote control device 116 is in an association mode (e.g., entered upon selection of one or more buttons). The lighting devices that store the group identifier may be part of the group of lighting devices that are associated with the remote control device 116 and can respond to group messages.

The multicast messages may be communicated more efficiently from the remote control device 116, as a single message may be transmitted to multiple lighting devices, such as lighting devices 112a, 112b, 122, at once. The load control instructions in the multicast messages may be received and implemented by multiple lighting devices, such as lighting devices 112a, 112b, 122, at the same time, or at nearly the same time with a minor delay due to differences in latency, as a single message is being received at a group of lighting devices within the same wireless range. For example, the lighting devices 112a, 112b, 122 may not transmit acknowledgement messages to the remote control device 116 in response to receiving multicast messages from the remote control device.

The size of the wireless communication range of the remote control device 116 may be dependent upon a transmit power of the remote control device 116 as well as environmental factors, such as walls, objects, equipment, people, etc. in the building in which the load control system 100 is installed. The transmit power may be set such that the remote control device 116 is able to communicate with an appropriate number of control devices in a space within the building even under worst case conditions where the environmental factors may be causes decreases or nulls in the wireless communication range. However, since the remote control device 116 may be a power-conservative control device, the power being consumed on the remote control device 116 may decrease as the transmit power is increased.

Though the remote control device 116 may be provided as an example of a power-conservative control device, other control devices may be power-conservative control devices and use similar procedures as described herein. An example of a power-conservative control devices may be control devices powered by a finite power source (e.g., a battery). Power-conservative control devices may be connected to an external direct current (DC) supply and may draw lower power from the DC power supply than control devices that may draw on a greater power supply, such as an AC power source. Power-conservative control devices may utilize super capacitors as a power source (e.g., which may have about 5% of the capacity of a battery). The super capacitors may be used to power the control device before the control device recharges the super capacitors. Power-conservative control devices may be powered from alternative energy sources (e.g., solar cells). Power-conservative control devices may minimize power drawn from the alternative energy sources.

The remote control device 116 may be characterized by a variable (e.g., adaptive) transmit power. For example, the remote control device 116 may transmit (e.g., initially transmit) a message (e.g., a unicast message) at a lower transmit power (e.g., a minimum transmit power $P_{MIN}$). If an acknowledgement message is not received in response to the message, the remote control device 116 may increase the transmit power and transmit the message again at the increased transmit power. The remote control device 116 may increase the transmit power to multiple intermediate transmit powers and determine if acknowledgement messages are received at each intermediate transmit power. The remote control device 116 may increase the transmit power to a maximum transmit power $P_{MAX}$, and may cease retransmitting the message if an acknowledgement message is not received at the maximum transmit power.

When an acknowledgement message is received, the remote control device 116 may store (e.g., learn) the present transmit power at which the last message was transmitted. The remote control device 116 may then transmit subsequent messages at the stored transmit power $P_{STORED}$. For example, the remote control device 116 may transmit messages (e.g., all subsequent messages) during a present control event at the stored transmit power $P_{STORED}$, and then revert to the minimum transmit power during a subsequent control event. In addition, the remote control device 116 may transmit messages at the stored transmit power $P_{STORED}$ during subsequent control events (e.g., all subsequent control events). Further, the remote control device 116 may transmit messages at the stored transmit power $P_{STORED}$ for a predetermined number (e.g., four) subsequent control events before reverting to the minimum transmit power during following control events.

The remote control device 116 may dynamically adjust the transmit power based on the type of message (e.g., unicast messages or multicast messages) and/or the type of command (e.g., on, off, move-to-level, move-with-fade, etc.) being transmitted. For example, the remote control device 116 may be configured to transmit unicast messages at the minimum transmit power $P_{MIN}$ and transmit multicast messages at the maximum transmit power $P_{MAX}$. In addition, the remote control device 116 may be configured to transmit messages including a move-to-level command (e.g., a move-to-level command that causes the lighting devices 112a, 112b, 122 to adjust their intensities by a relatively small amount) and/or a move-with-rate command at the minimum transmit power $P_{MIN}$. Further, the remote control device 116 may be configured to transmit messages including an on command, an off command, a toggle command, and/or a move-to-level command that causes the lighting devices 112a, 112b, 122 to adjust their intensities by a large amount (e.g., a move-to-level command that causes an "on" event or an "off" event) at the maximum transmit power $P_{MAX}$.

After a remote control device has stored a transmit power for transmitting messages to other control devices, the remote control device may update the stored transmit power $P_{STORED}$. For example, the remote control device 116 may update the stored transmit power $P_{STORED}$ to mitigate battery usage at the remote control device 116 and/or to increase the likelihood of successful communications in response to changes in network conditions (e.g., to account for changes in distance, interference, and/or channel conditions between the remote control device 116 and the other control devices). The remote control device 116 may update the stored transmit power $P_{STORED}$ for transmitting communications during a learning procedure. During the learning procedure, the remote control device may increase or decrease a learned transmit power $P_{LEARN}$ to identify the updated transmit power for being stored at the remote control device.

Embodiments described herein are not limited to remote control devices. Other control devices may also be used in the same, or similar, manner. For example, embodiments may include wired control devices and/or plug-in control devices that communicate messages as described herein.

FIG. 1B shows an example of the load control system 100 having other devices. For example, the load control system 100 may include other control devices, such as controller devices and/or load control devices. The load control devices may be capable of controlling the amount of power provided to a respective electrical load based on messages received from the controller devices, which may be input devices. The messages may include load control instructions or another indication that causes the load control device to determine load control instructions for controlling an electrical load.

Examples of load control devices may include a motorized window treatment 130 and/or the lighting devices 112a, 112b, 122, though other load control devices may be implemented. The controller devices may include a remote control device 150, an occupancy sensor 160, a daylight sensor 170, and/or a network device 190, though other controller devices may be implemented. The controller devices may perform communications in a configuration similar to the remote control device 116 as described herein. The load control devices may perform communications in a configuration similar to the lighting devices 112a, 112b, 122 as described herein.

The load control devices may receive messages via wireless signals, e.g., radio-frequency (RF) signals 106 (e.g., ZIGBEE®; NFC; BLUETOOTH®; BLE, THREAD®; a proprietary communication protocol, such as CLEAR CONNECT™, CLEAR CONNECT TYPE X™, etc.). The wireless signals may be transmitted by the controller devices. In response to the received messages, the respective lighting devices 112a, 112b, 122 may be turned on and off, and/or the intensities of the respective lighting devices 112a, 112b, 122 may be increased or decreased. In response to the received messages, the motorized window treatment 130 may increase or decrease a level of a covering material 134.

The battery-powered remote control device 150 may include one or more actuators 152 (e.g., one or more of an on button, an off button, a raise button, a lower button, or a preset button). The battery-powered remote control device 150 may transmit RF signals 106 in response to actuations of one or more of the actuators 152. The battery-powered remote control device 150 may be handheld. The battery-powered remote control device 150 may be mounted vertically to a wall, or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHTLIGHT, the entire disclosures of which are hereby incorporated by reference.

The remote control device 150 may be a wireless device capable of controlling a load control device via wireless communications. The remote control device 150 may be attached to the wall or detached from the wall. Examples of remote control devices are described in greater detail in U.S. Pat. No. 5,248,919, issued Sep. 28, 1993, entitled LIGHTING CONTROL DEVICE; U.S. Pat. No. 8,471,779, issued Jun. 25, 2013, entitled WIRELESS BATTERY-POWERED REMOTE CONTROL WITH LABEL SERVING AS ANTENNA ELEMENT; and U.S. Pat. No. 9,679,696, issued Jun. 13, 2017, entitled WIRELESS LOAD CONTROL DEVICE, the entire disclosures of which are hereby incorporated by reference.

The occupancy sensor 160 may be configured to detect occupancy and/or vacancy conditions in the space in which the load control system 100 is installed. The occupancy sensor 160 may transmit messages to load control devices via the RF communication signals 106 in response to detecting the occupancy or vacancy conditions. The occupancy sensor 160 may operate as a vacancy sensor, such that messages are transmitted in response to detecting a vacancy condition (e.g., messages may not be transmitted in response to detecting an occupancy condition). The occupancy sensor 160 may enter an association mode and may transmit association messages via the RF communication signals 106 in response to actuation of a button on the occupancy sensor 160. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 170 may be configured to measure a total light intensity in the space in which the load control system 100 is installed. The daylight sensor 170 may transmit messages including the measured light intensity via the RF communication signals 106 for controlling load control devices in response to the measured light intensity. The daylight sensor 170 may enter an association mode and may transmit association messages via the RF communication signals 106 in response to actuation of a button on the daylight sensor 170. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The motorized window treatment 130 may be mounted in front of a window for controlling the amount of daylight entering the space in which the load control system 100 is installed. The motorized window treatment 130 may include, for example, a cellular shade, a roller shade, a drapery, a Roman shade, a Venetian blind, a Persian blind, a pleated blind, a tensioned roller shade systems, or other suitable motorized window covering. The motorized window treatment 130 may include a motor drive unit 132 for adjusting the position of a covering material 134 of the motorized window treatment 130 in order to control the amount of daylight entering the space. The motor drive unit 132 of the motorized window treatment 130 may have an RF receiver and an antenna mounted on or extending from a motor drive unit 132 of the motorized window treatment 130. The motor drive unit 132 may respond to messages to increase or decrease the level of the covering material 134. The motor drive unit 132 of the motorized window treatment 130 may be battery-powered or may receive power from an external direct-current (DC) power supply. Examples of battery-powered motorized window treatments are described in greater detail in commonly-assigned U.S. Pat. No. 8,950,461, issued Feb. 10, 2015, entitled MOTORIZED WINDOW TREATMENT, and U.S. Pat. No. 9,115,537, issued Aug. 25, 2015, entitled BATTERY-POWERED ROLLER SHADE SYSTEM, the entire disclosures of which are hereby incorporated by reference Messages transmitted by the controller devices may include a command and/or identifying information, such as a serial number (e.g., a unique identifier) associated with the transmitting controller device. Each of the controller devices may be associated with the lighting devices 112a, 112b, 122 and/or the motorized window treatment 130 during a configuration procedure of the load control system 100, such that the lighting devices 112a, 112b, 122 and/or the motorized window treatment 130 may be responsive to messages transmitted by the controller devices via the RF signals 106. Examples of associating wireless control devices during a configuration procedure are described in greater detail in commonly-assigned U.S. Patent Application Publication No. 2008/0111491, published May 15, 2008, entitled RADIO-FREQUENCY LIGHTING CONTROL SYSTEM, and U.S. Pat. No. 9,368,025, issued Jun. 14, 2016, entitled TWO-PART LOAD CONTROL SYSTEM MOUNTABLE TO A SINGLE ELECTRICAL WALLBOX, the entire disclosures of which are hereby incorporated by reference.

The load control system 100 may include a system controller 180 (e.g., a hub device) configured to enable communication with a network 182, e.g., a wireless or wired local area network (LAN). For example, the system controller 180 may be connected to a network router (not shown) via a wired digital communication link 184 (e.g., an Ethernet communication link). The network router may allow for communication with the network 182, e.g., for access to the Internet. The system controller 180 may be wirelessly connected to the network 182, e.g., using wireless technology, such as WI-FI® technology, cellular technology, etc. The system controller 180 may be configured to transmit communication signals (e.g., RF signals 106) to the lighting devices 112a, 112b, 122 and/or the motorized window treatment 130 for controlling the devices in response to messages received from external devices via the network 182. The system controller 180 may communicate via one or more types of RF communication signals (e.g., ZIGBEE®; NFC; BLUETOOTH®; BLE, WI-FI®, cellular, THREAD®; a proprietary communication protocol, such as CLEAR CONNECT™, CLEAR CONNECT TYPE X™, etc.). The system controller 180 may be configured to transmit and/or receive RF signals 106 (e.g., using ZIGBEE®; NFC; THREAD®, BLUETOOTH®; BLE, or a proprietary communication channel, such as CLEAR CONNECT™, CLEAR CONNECT TYPE X™, etc.). The system controller 180 may be configured to transmit messages via the network 182 for providing data (e.g., status information) to external devices.

The RF signals 106 may be transmitted via one or more protocols. For example, the remote control device 116 and the remote control device 150 may communicate messages to lighting devices 112a, 112b, 122 via another protocol (e.g., ZIGBEE®, BLUETOOTH®, THREAD®, BLE, etc.) than other devices. For example, the occupancy sensor 160, daylight sensor 170, and/or motorized window treatment 130 may communicate via a proprietary communication channel, such as CLEAR CONNECT™ or CLEAR CONNECT TYPE X™. The system controller 180 may format digital communications using the appropriate protocol for the device. The system controller 180 may communicate using multiple protocols.

The system controller 180 may operate as a central controller for the load control system 100, and/or relay messages between the control devices (e.g., lighting devices, motorized window treatments, etc.) of the load control system and the network 182. The system controller 180 may receive messages from a controller device and configure the message for communication to a load control device. For example, the system controller 180 may configure multicast messages and/or unicast messages for transmission as described herein. The system controller 180 may be on-site at the load control system 100 or at a remote location. Though the system controller 180 is shown as a single device, the load control system 100 may include multiple hubs and/or the functionality thereof may be distributed across multiple devices.

The load control system 100 may include a network device 190, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device, (for example, an iPad® handheld computing device), a WI-FI® or wireless-communication-capable television, or any other suitable network communication or Internet-Protocol-enabled device. The network device 190 may be operable to transmit messages in one or more Internet Protocol packets to the system controller 180 via RF signals 108, either directly or via the network 182. For example, the network device 190 may transmit the RF signals 108 to the system controller 180 via a WI-FI® communication link, a WIMAX® communications link, a BLUETOOTH® communications link, a near field communication (NFC) link, a cellular communications link, a television white space (TVWS) communication link, or any combination thereof. The RF signals 108 may be communicated using a different protocol and/or wireless band than the RF signals 106. For example, the RF signals 108 may be configured for WI-FI® communication or cellular communication, while RF signals 106 may be configured for ZIGBEE®, BLUETOOTH®, BLE, THREAD, or a proprietary communication channel, such as CLEAR CONNECT™ or CLEAR CONNECT TYPE X™. In another example, the RF signals 108 and the RF signals 106 may be the same. Examples of load control systems operable to communicate with network devices on a network are described in greater detail in commonly-assigned U.S. Pat. No. 10,271,407 issued Apr. 23, 2019, entitled LOAD CONTROL DEVICE HAVING INTERNET CONNECTIVITY, the entire disclosure of which is hereby incorporated by reference.

The network device 190 may include a visual display 192. The visual display 192 may include a touch screen that may include, for example, a capacitive touch pad displaced overtop the visual display, such that the visual display may display soft buttons that may be actuated by a user. The network device 190 may include a plurality of hard buttons, e.g., physical buttons (not shown), in addition to the visual display 192. The network device 190 may download a product control application for allowing a user of the network device 190 to control the load control system 100. In response to actuations of the displayed soft buttons and/or hard buttons, the network device 190 may transmit messages to the load control devices and/or the system controller 180 through the wireless communications described herein.

The operation of the load control system 100 may be programmed and configured using the system controller 180 and/or network device 190. An example of a configuration procedure for a wireless load control system is described in greater detail in commonly-assigned U.S. Pat. No. 10,027,127, issued Jul. 17, 2018, entitled COMMISSIONING LOAD CONTROL SYSTEMS, the entire disclosure of which is hereby incorporated by reference.

The lighting devices 112a, 112b, 122 may each be included in a group of lighting devices that are associated with a common control device, such as the remote control device 116. For example, each of the lighting devices 112a, 112b, 122 may store the unique identifier of the remote control device 116 during an association mode to enable the lighting devices 112a, 112b, 122 to be controlled by messages from the remote control device 116 that include control instructions. The system controller 180 may store the associations between each of the lighting devices 112a, 112b, 122 and the remote control device 116 during an association mode. The association information may be used by the system controller 180 for routing messages to the lighting devices 112a, 112b, 122, or the lighting devices 112a, 112b, 122 may receive messages from the remote control device 116 directly.

The remote control device 116 may be configured to transmit messages to the lighting devices 112a, 112b, 122 via the system controller 180. For example, the remote control device 116 may be configured to transmit unicast messages to the system controller 180. The system controller 180 may be configured to transmit an acknowledgement message to the remote control device 116 in response to receiving a unicast message from the remote control device. The system controller 180 may be configured to transmit unicast and/or multicast messages to the lighting devices 112a, 112b, 122 for controlling the lighting devices in response to the unicast message received from the remote control device 116. For example, the remote control device 116 may transmit a message including a toggle command or an on/off command (e.g., an "on" command or an "off" command) for controlling the lighting devices 112a, 112b, 122 to toggle the lighting devices 112a, 112b, 122 from an "on" state to an "off" state, or vice versa. The remote control device 116 may transmit a unicast message including the toggle command or the on/off command to the system controller 180, which may transmit a multicast message that is received at each of the lighting devices 112a, 112b, 122. In addition, the remote control device 116 may transmit a unicast message including a move-to-level command or a move-with-rate command to the system controller 180, which may transmit unicast messages that are independently directed to each of the lighting devices 112a, 112b, 122.

The system controller 180 may operate as a parent device (e.g., a master device) that may be configured to monitor the state of child devices (e.g., slave devices), such as lighting devices 112a, 112b, 122, and determine the appropriate command to be transmitted in response to a user interface event based on the state of the slave devices. Though the system controller 180 may be described herein as being a master device for controlling a group of lighting devices, other control devices (e.g., one of the lighting devices 112a, 112b, 122, remote control device 150, occupancy sensor 160, daylight sensor 170, network device 190, motorized window treatment 132, a remote computing device, etc.) may be assigned as a master device that operates as described herein for the system controller 180. When a lighting device 112a, 112b, 122 is assigned as the master device, the lighting device 112a, 112b, 122 may already know its own state, but may monitor the state of other slave devices. Though other control devices may operate as the master device, they may still communicate via the system controller 180.

The system controller 180 may keep track of the on/off state of each of the lighting devices 112a, 112b, 122 after being implemented in the load control system 100. Upon initial implementation into the load control system, the system controller 180 may query the lighting devices 112a, 112b, 122 for their current on/off state. The query message may be sent as a multicast message, or individual unicast messages, to each of the lighting devices 112a, 112b, 122. The lighting devices 112a, 112b, 122 may return the current on/off state, which may be stored locally thereon. The system controller 180 may identify commands communicated to the lighting devices 112a, 112b, 122 and maintain the current on/off state of the lighting devices 112a, 112b, 122 in memory. The messages that are communicated to the lighting devices 112a, 112b, 122 for controlling the on/off state may be monitored to determine the current on/off state, without sending an initial query message. The system controller 180 may be powered and/or awake at all times (e.g., at all times than the lighting devices 112a, 112b, 122 are also powered), such that the system controller is able to monitor the states of the lighting devices by listening to the messages transmitted by the lighting devices. In addition, the system controller 180 may enter a sleep mode and periodically wake up to transmit query messages to the lighting devices 112a, 112b, 122 to determine the on/off states of the lighting devices.

When the system controller 180 receives an indication of a toggle event from the remote control device 116, the system controller 180 may choose the command to send, or whether to send a command, to the lighting devices 112a, 112b, 122. The decision at the system controller 180 may be based on the current on/off state of the lighting devices 112a, 112b, 122. The system controller 180 may identify whether the on/off state across the group of lighting devices 112a, 112b, 122 is consistent. If the on/off state across the group of lighting devices 112a, 112b, 122 is consistent, the system controller 180 may send the toggle command, or an "on" command or "off" command, to the lighting devices 112a, 112b, 122 to toggle the on/off state of the group of lighting devices 112a, 112b, 122.

The lighting devices 112a, 112b, 122 that change an on/off state in response to an "on" command or an "off" command may send a state update message to the system controller 180 to indicate the change in on/off state. The system controller 180 may receive the state update message from the lighting devices 112a, 112b, 122 that change state in response to the received "on" command or the received "off" command. The lighting devices that fail to change the on/off state in response to the command from the system controller 180 may be unresponsive. For example, the system controller 180 may send an "off" command to the lighting devices 112a, 112b, 122 and the lighting device 122 may update the on/off state to the "off" state. The lighting device 122 may send a response message to the system controller 180 to indicate the change in state. The system controller 180 may store the updated state and/or confirm the state of the unresponsive devices. The system controller 180 may, alternatively, store the updated state of the lighting device 122 after sending the command. As the system controller 180 may be maintaining the on/off state of the lighting devices 112a, 112b, 122, the remote control device 116 may go to sleep after transmitting a message in response to the toggle event.

As previously mentioned, the remote control device 116 may be characterized by an adaptive transmit power. The remote control device 116 may be configured to adjust the transmit power depending upon whether acknowledgement messages are received from a parent device (e.g., the system controller 180). For example, the remote control device 116 may transmit (e.g., initially transmit) a message (e.g., a unicast message) to the system controller 180 at a lower transmit power (e.g., a minimum transmit power $P_{MIN}$). If an acknowledgement message is not received from the system controller 180 in response to the message, the remote control device 116 may increase the transmit power and transmit the message to the system controller 180 again at the increased transmit power. The remote control device 116 may increase the transmit power to multiple intermediate transmit powers and determine if acknowledgement messages are received from the system controller 180 at each intermediate transmit power. The remote control device 116 may increase the transmit power to a maximum transmit power $P_{MAX}$, and may cease retransmitting the message to the system controller 180 if an acknowledgement message is not received at the maximum transmit power.

When the system controller 180 receives the message from the remote control device 116 (e.g., at one of the transmit powers), the system controller may transmit one or more messages (e.g., unicast and/or multicast messages) to the lighting devices 112a, 112b, 122 for controlling the lighting devices in response to the message transmitted by the remote control device 116. For example, since the system controller 180 may be powered from an external power source (e.g., not battery-powered), the system controller 180 may transmit the messages to the lighting devices 112a, 112b, 122 at a hub transmit power (e.g., a static maximum or nominal hub transmit power). When the system controller 180 receives the message from the remote control device 116, the system controller may also transmit an acknowledgement message to the remote control device 116.

When an acknowledgement message is received from the system controller 180, the remote control device 116 may store (e.g., learn) the present transmit power at which the last message was transmitted. The remote control device 116 may then transmit subsequent messages at the stored transmit power $P_{STORED}$. For example, the remote control device 116 may transmit messages (e.g., all subsequent messages) during a present control event at the stored transmit power $P_{STORED}$, and then revert to the minimum transmit power during a subsequent control event. In addition, the remote control device 116 may transmit messages at the stored transmit power $P_{STORED}$ during subsequent control events (e.g., all subsequent control events). Further, the remote control device 116 may transmit messages at the stored transmit power $P_{STORED}$ for a predetermined number (e.g., four) subsequent control events before reverting to the minimum transmit power during following control events.

The remote control device 116 may dynamically adjust the transmit power based on the type of command (e.g., on, off, move-to-level, move-with-fade, etc.) being transmitted to the system controller 180. For example, the remote control device 116 may be configured to transmit messages including a move-to-level command (e.g., a move-to-level command that causes the lighting devices 112a, 112b, 122 to adjust their intensities by a relatively small amount) and/or a move-with-rate command to the system controller 180 at the minimum transmit power $P_{MIN}$. The system controller 180 may be configured to transmit unicast messages individually to the lighting devices 112a, 112b, 122 for controlling the lighting devices in response to the message received from the remote control device 116 (e.g., when the command is a move-with rate command and/or a move-to-level command that causes the lighting devices 112a, 112b, 122 to adjust their intensities by a relatively small amount). In addition, the remote control device 116 may be configured to transmit messages including an on command, an off command, a toggle command, and/or a move-to-level command that causes the lighting devices 112a, 112b, 122 to adjust their intensities by a large amount (e.g., a move-to-level command that causes an "on" event or an "off" event) to the system controller 180 at the maximum transmit power $P_{MAX}$. The system controller 180 may be configured to transmit a multicast message to the lighting devices 112a, 112b, 122 for controlling the lighting devices in response to the message received from the remote control device 116 (e.g., when the command is an on command, an off command, a toggle command, and/or a move-to-level command that causes the lighting devices 112a, 112b, 122 to adjust their intensities by a relatively large amount).

After a remote control device has stored a transmit power for transmitting messages to a system controller, the remote control device may update the stored transmit power $P_{STORED}$. For example, the remote control device 116 may update the stored transmit power $P_{STORED}$ to mitigate battery usage at the remote control device 116 and/or to increase the likelihood of successful communications with the system controller 180 in response to changes in network conditions (e.g., to account for changes in distance, interference, and/or channel conditions between the remote control device and the system controller). The remote control device 116 may update the stored transmit power $P_{STORED}$ for transmitting communications during a learning procedure. During the learning procedure, the remote control device 116 may increase or decrease a learned transmit power $P_{LEARN}$ to identify the updated transmit power for being stored at the remote control device 116.

Figure 2A:
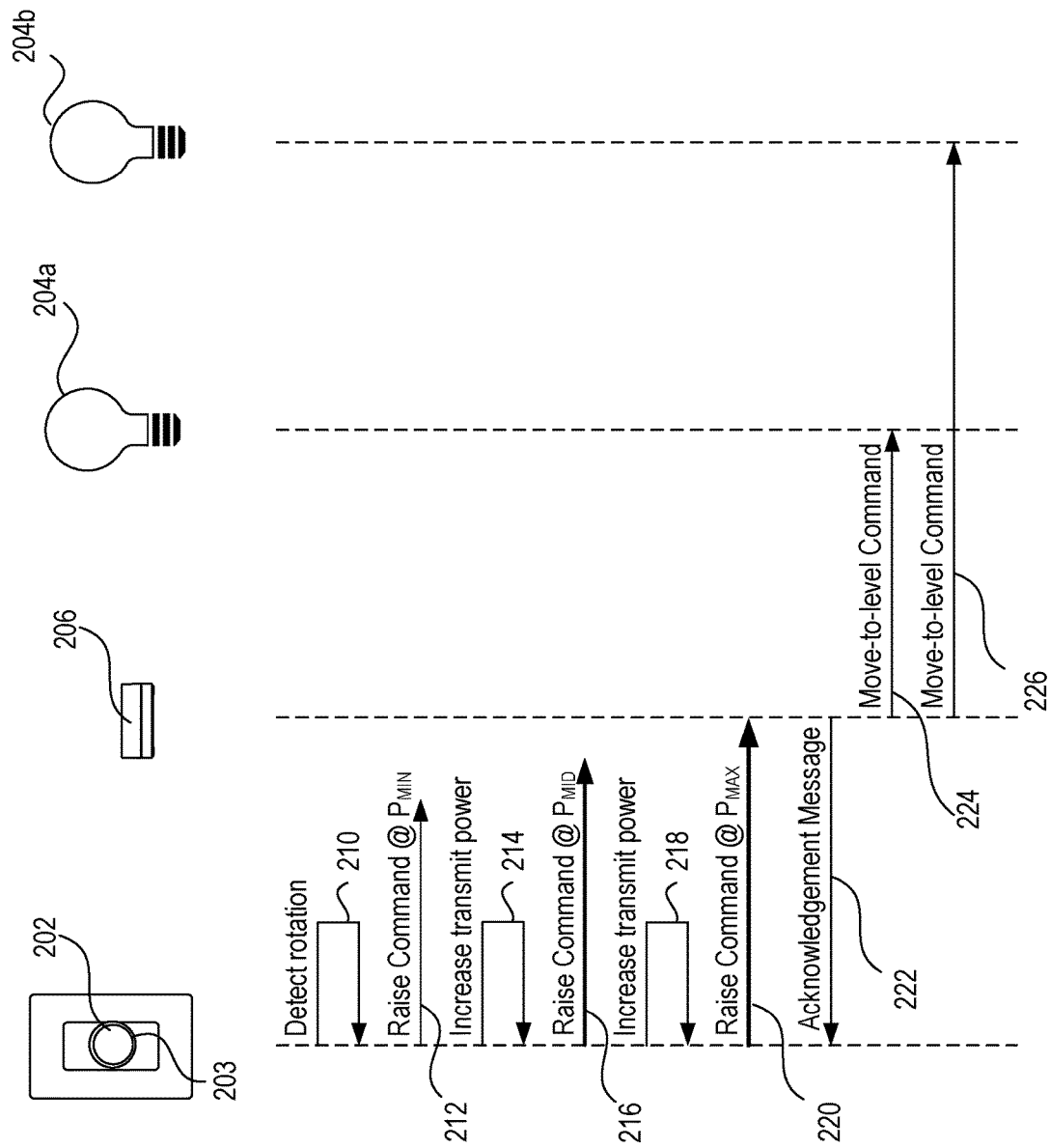
FIGS. 2A and 2B are sequence diagrams depicting example message flows for communicating messages between a remote control device and lighting devices in a load control system.
Figure 2B:
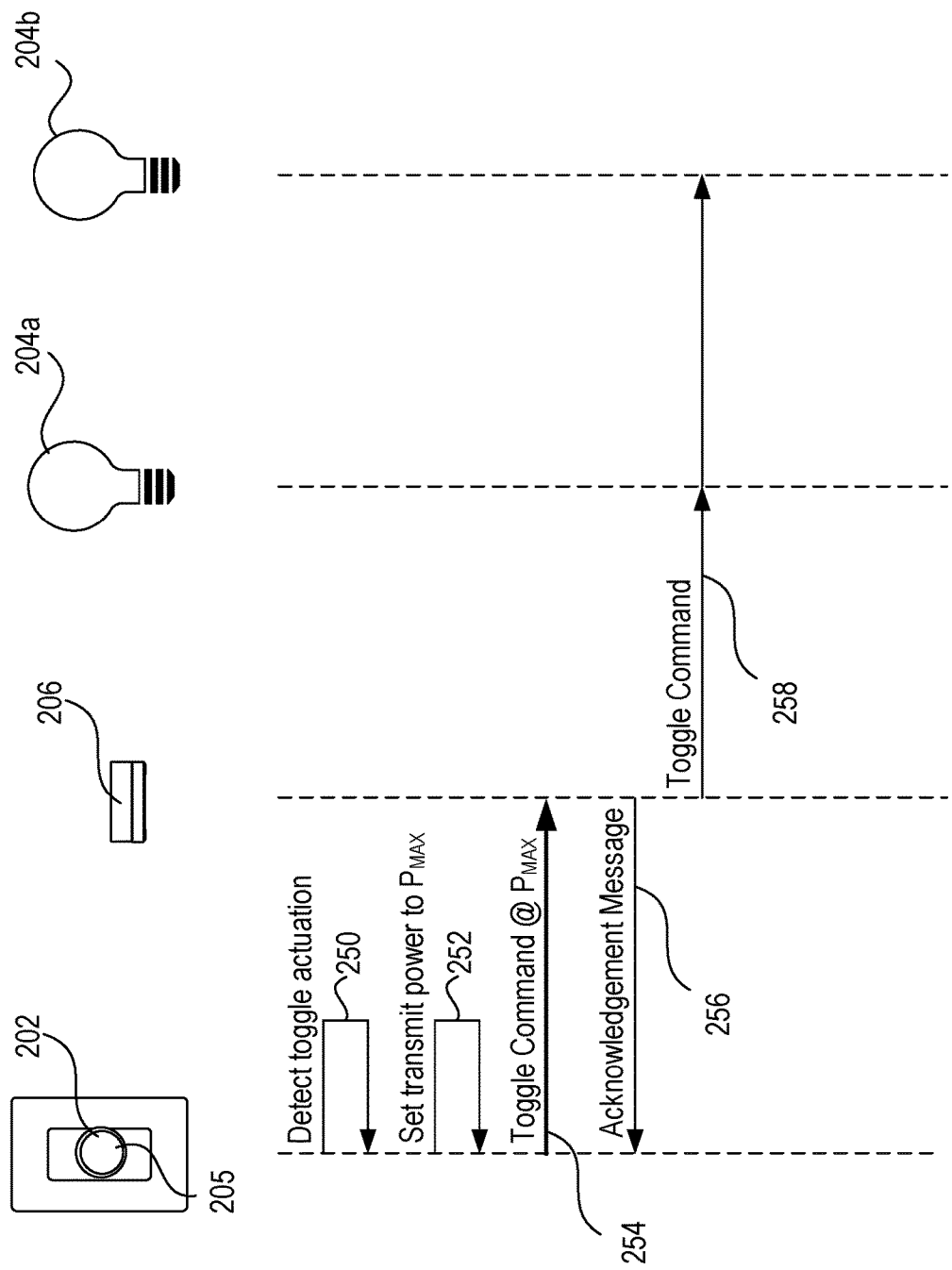

FIGS. 2A and 2B are sequence diagrams depicting example message flows for communicating messages between a remote control device 202 (e.g., the remote control device 116), lighting devices 204a, 204b (e.g., the lighting devices 112a, 112b, 122), and a system controller 206 (e.g., the system controller 180) in a load control system (e.g., the load control system 100). The remote control device 202 may be a child device of the system controller 206, which may operate as a parent device. The remote control device 202 may include a finite power source (e.g. may be battery powered). Further, the distance, interference, and/or channel quality between the remote control device 202 and the system controller 206 and/or the lighting devices 204a, 204b may change over time. A user input (e.g., a user interaction, such as a rotation of a rotation portion and/or an actuation of an actuation portion) may be detected asynchronously (e.g., may not be detected at regular intervals). Accordingly, the remote control device 202 may be unable to predict when a user input is detected and/or prepare for an upcoming message transmission (e.g., account for changes in distance, interference, and/or channel conditions). To preserve the amount of power available in the finite power source and/or increase the likelihood that messages transmitted from the remote control device 202 are received, an adaptive transmit power may be implemented for messages communicated from the remote control device 202. The adaptive transmit power may be a variable transmit power or a transmit power that is otherwise adapted as described herein.

FIG. 2A is a sequence diagram depicting example message flows for communicating messages at an adaptive transmit power. As shown in FIG. 2A, the remote control device 202 may detect a user input at 210, for example, a rotation of a rotation portion 203 of the remote control device 202 (e.g., the rotation portion 118 of the remote control device 116). Rotation (e.g., clockwise rotation) of the rotation portion 203 may indicate a raise command, which may cause transmission of one or more messages to increase the lighting level of the lighting devices 204a, 204b. Rotation (e.g., counter clockwise rotation) of the rotation portion 203 may indicate a lower command, which may cause transmission of one or more messages to decrease the lighting level of the lighting devices 204a, 204b. As shown in FIGS. 2A and 2B, the remote control device 202 may transmit messages to toggle the on/off state and/or raise/lower the lighting level of the lighting devices 204a, 204b.

As illustrated in FIG. 2A, the transmit power of a message may be increased over a period of time. The transmit power of the message may be increased after a predefined period of time has elapsed. The transmit power may be increased a predefined number of times, or until one or more messages are transmitted at a threshold transmit power. The transmit power may be increased when an acknowledgement message responding to a prior message fails to be received within a predefined period of time. Increasing the transmit power of message, as described herein, may increase the likelihood that communications from the remote control device 202 to a respective device (e.g., the system controller 206 and/or lighting device 204a, 204b) are successful.

At 212, the remote control device 202 may transmit a raise command at a transmit power (e.g., a transmit power level) to the system controller 206. The transmit power may be based on the command. The command may include a command type on which the transmit power may be based. The command type may include an on command, off command, toggle command, raise command, lower command, an amount to raise/lower, a level to go to, a move-to-level command, a move-to-level-with-rate command, a move-with-fade command, a preset command, or another command type. The command types may be differentiated by a relative amount of change they may cause in the intensities of the lighting devices 204a, 204b. For example, raise/lower commands may be defined as having a command type that may cause a relatively smaller change in the intensities of the lighting devices 204a, 204b than an on/off command or a toggle command. A raise/lower command or another command indicating a level to go to (e.g., a move-to-level-with-rate command, a move-with-fade command, a preset command, or another command type) may cause greater than a threshold level of change if the amount of change is greater than a predefined change in intensity (e.g., 25%, 50%, or 75% change in intensity at the lighting load). A raise/lower command or another command indicating a level to go to (e.g., a move-to-level-with-rate command, a move-with-fade command, a preset command, or another command type) may cause less than a threshold level of change if the amount of change is less than a predefined change in intensity (e.g., 25%, 50%, or 75% change in intensity at the lighting load).

Commands that cause relatively smaller changes in the intensities of the lighting devices 204a, 204b (e.g., raise command and/or lower command) than other commands may be initially transmitted at an initial transmit power. The initial transmit power may be a minimum transmit power $P_{MIN}$. The minimum transmit power $P_{MIN}$ may be the minimum transmit power for the device, or a minimum transmit power for a series of messages transmitted over a period of time. For example, the minimum transmit power $P_{MIN}$ may be a low value (e.g., −5 dB).

The transmit power of messages for communicating a command may be increased over a period of time. For example, the transmit power of a message may be increased after a predefined period of time (e.g., if an acknowledgement message to the command fails to be received). Referring to FIG. 2A, the system controller 206 may be configured to transmit an acknowledgement message in response to receiving a message that includes a command from the remote control device 202. However, the remote control device 202 may not receive an acknowledgement message of the initial command transmitted in a message at 212 (e.g., as the system controller may have failed to receive the message), which may be due to the transmit power of the initial message.

The remote control device 202 may increase the transmit power at 214 and transmit a subsequent raise command at the increased transmit power at 216. The transmit power of the message transmitted at 216 may be a mid-level transmit power $P_{MID}$ (e.g., an intermediate transmit power). The transmit power $P_{MID}$ may be a higher transmit power than the transmit power $P_{MIN}$ (e.g., greater than −5 dB), which may increase the likelihood that the system controller 206 receives the raise command transmitted in the message at 216. The remote control device 202 may still fail to receive an acknowledgement message to the second raise command transmitted at 216 after a predefined period of time. For example, the system controller 206 may fail to receive the raise commands transmitted at 212 and/or 216 because of interference within the load control system and/or because the transmit power of the respective raise commands was insufficient (e.g., the transmit power of the commands are not high enough to reach the system controller 206 due to the relative location of the remote control device 202).

The remote control device 202 may be configured to transmit subsequent commands at higher transmit powers until, for example, an acknowledgement message is received or a maximum transmit power is reached for the device or for the series of communications transmitted from the device. Referring to FIG. 2A, the remote control device 202 may increase the transmit power at 218 and transmit a raise command in a message at the increased transmit power at 220. The increased transmit power of the message transmitted at 220 may be a maximum transmit power $P_{MAX}$. The maximum transmit power $P_{MAX}$ may be a maximum transmit power supported by the remote control device 202, and/or a maximum transmit power for the series of messages transmitted over a period of time. For example, the maximum transmit power $P_{MAX}$ may be a higher value (e.g., +14 dB) than the transmit power of other messages. At 222, the remote control device 202 may receive an acknowledgement message from the system controller 206 that indicates receipt of the raise command transmitted at 216. The system controller 206 may transit messages (e.g., unicast messages) including a move-to-level command to lighting device 204a, 204b at 224 and 226, respectively, based on the raise command received at 220.

Although FIG. 2A is illustrated to include three distinct transmit powers (e.g., $P_{MIN}$, $P_{MID}$, and $P_{MAX}$), the example illustrated in FIG. 2A may include any number (e.g., more or less than three) of distinct transmit powers. Similarly, the transmit power used for a certain transmission may include any transmit power value. Accordingly, although the raise command is used and certain transmit powers are indicated (e.g., $P_{MIN}$, $P_{MID}$, and $P_{MAX}$) other types of commands and/or transmit powers may be implemented. Additionally, although FIG. 2A and other examples herein provide a remote control device and/or lighting devices that may be implemented using the procedures described herein, other control devices may be similarly implemented. For example, e.g., the motorized window treatment 130, the occupancy sensor 160, the daylight sensor 170, the network device 190, and/or other devices may be power-conservative control devices that may operate as described with regard to the remote control device 202 for conserving power in transmission of messages. Each of these devices, or other devices in the load control system, may communicate with parent devices or other devices in the load control system using the procedures described herein.

FIG. 2B is a sequence diagram depicting example message flows for communicating messages at an adaptive transmit power, for example, based on a command type. The remote control device 202 may detect a user input, for example, an actuation of an actuation portion 205 of the remote control device 202 (e.g., the actuation portion 117 of the remote control device 116) at 250. Actuation of the actuation portion 205 may indicate a toggle command, which may cause transmission of one or more messages to toggle the state of the lighting device 204a, 204b. In addition, actuation of the actuation portion 205 may indicate an on command (e.g., to turn on the lighting devices 204a, 204b) and/or an off command (e.g., to turn off the lighting devices 204a, 204b). As described herein, actuation of the actuation portion 205 may be detected asynchronously (e.g., may be detected without notice and/or may not be detected at regular intervals), and the remote control device 202 may be unable to predict when a user input is detected and/or prepare for an upcoming message transmission (e.g., account for changes in distance, interference, and/or channel conditions).

The messages of certain commands may be transmitted at a certain transmit power, which may increase the likelihood that the message is received. For example, commands that change the lighting level of a respective lighting device (e.g., one or more of the lighting devices 204a, 204b) by a large amount (e.g., by an amount that exceeds a threshold) may be transmitted at a predetermined transmit power that increases the likelihood that the message is received. A toggle command may be a command that is transmitted at the predetermined transmit power to increase the likelihood that the toggle command is received (e.g., because the toggle command typically causes a change in the lighting level of lighting devices by an amount above the threshold). For example, when a toggle command fails to be received, lighting devices may become out of sync, the effects of which may be noticeable. Similarly, other commands, such as an on command, an off command, and/or a move-to-level command that adjusts the lighting intensity level of a lighting device by an amount above the threshold, (e.g., from 5% to 95%), may be transmitted at the predetermined transmit power to increase the likelihood that the commands are received.

After the actuation of the actuation portion 205 is detected at 250, the remote control device 202 may set the transmit power to the predetermined transmit power, such as a maximum transmit power $P_{MAX}$. At 254, the remote control device 202 may transmit a message indicating a toggle command to the system controller 206 at the maximum transmit power $P_{MAX}$. The maximum transmit power $P_{MAX}$ may be the maximum transmit power for a device, or a maximum transmit power for a series of messages transmitted over a period of time. At 256, in response to the receiving the toggle command transmitted at 254, the system controller 206 may transmit an acknowledgement message to the remote control device 202. The acknowledgement message transmitted at 256 may indicate that the message transmitted at 254 was received. At 258, the system controller 206 may transmit a message (e.g., a multicast message) that includes a toggle command to the lighting devices 204a, 204b, which may cause the lighting device 204a, 204b to toggle their state. After receiving the message transmitted at 256, lighting device 204a, 204b may toggle from their initial on state to an off state.

Figure 3A:
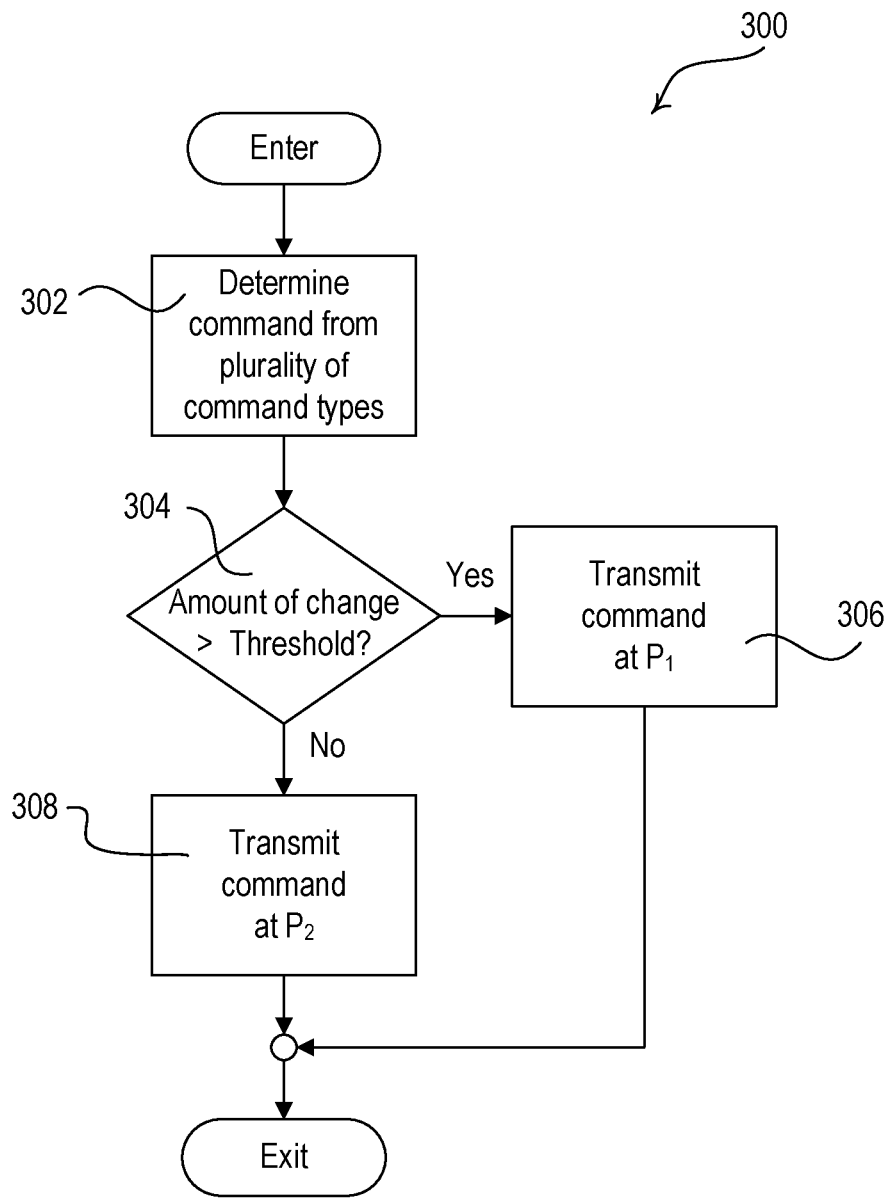
FIGS. 3A, 3B, and 3C are flowcharts depicting example procedures for communicating messages using an adaptive transmit power.

A control device (e.g., the remote control device 116, the motorized window treatment 130, the remote control device 150, the occupancy sensor 160, the daylight sensor 170, the network device 190, and/or the remote control device 202) may transmit messages at a transmit power based on the command type being transmitted in the message. The transmission at a transmit power based on the command type may allow for messages to be transmitted at a higher power level that have a greater level of importance or may cause a more noticeable change to the user, and/or at a lower power level for lower priority messages or messages that may cause a less noticeable change to the user. FIG. 3A is a flowchart depicting an example procedure 300 for transmitting messages from control devices in a load control system using an adaptive transmit power that varies based on the command type being transmitted in the message. The procedure 300 may be performed by a power-conservative control device, such as a control device that is powered by a finite power source (e.g., the remote control device 116, the motorized window treatment 130, the remote control device 150, the occupancy sensor 160, the daylight sensor 170, the network device 190, and/or the remote control device 202). As described herein, the control device may be configured to transmit commands in a manner such that the finite power source is conserved. For example, as illustrated in the procedure 300, the control device may determine a transmit power for a given command based on the command type. The procedure 300 may be asynchronously performed, for example, in response to a user input (e.g., rotation of a rotation portion and/or actuation of an actuation portion) and may account for unknown message transmission conditions (e.g., account for changes in distance, interference, and/or channel conditions). For example, the procedure 300 may be performed by the remote control devices 116, 202 to transmit messages to a parent device (e.g., the system controller 180, 206), which may include commands for controlling one or more load control devices (e.g., the lighting devices 112a, 112b, 122, 204a, 204b).

At 302, the control device may determine a command from a plurality of command types based on the user input. The plurality of command types may include an on command, off command, toggle command, raise command, lower command, an amount to raise/lower, a level to go to, a move-to-level command, a move-to-level-with-rate command, a move-with-fade command, and/or a preset command. The command type may include different commands that change the lighting level of a lighting device by different amounts. At 304, the control device may determine if the command causes a change in the lighting level of a lighting device by an amount that is greater than a threshold. For example, commands that change the lighting intensity levels by an amount that is greater than a threshold may include an on command, an off command, a toggle command, a raise command that raises the lighting level by an amount that is greater than the threshold, a lower command that lowers the lighting level by an amount that is greater than the threshold, and/or a move-to-level command that adjusts the lighting level by an amount that is greater than the threshold. As described herein, commands that change lighting intensity levels by an amount that is greater than the threshold may initially be transmitted at a transmit power $P_1$ that increases the likelihood that the message is received. The transmit power $P_1$ may be a greater transmit power than another transmit power $P_2$ that may conserve more batter power per transmission. For example, the transmit power $P_1$ may be a maximum transmit power $P_{MAX}$ for transmitting from the control device, or another transmit power that is greater than the transmit power $P_2$. If the command is determined at 304 to change lighting intensity levels by an amount that is greater than the threshold, a message that includes the command may be transmitted at the maximum transmit power $P_1$ at 306, which may increase the likelihood that the command message is received after transmission.

If, however, the command is determined to adjust lighting intensity levels by an amount less than (e.g., less than or equal to) the threshold, the control device may transmit at 308 a message that includes the command at the transmit power $P_2$. For example, commands that change the lighting intensity levels by an amount that is less than a threshold may include an a raise command that raises the lighting level by an amount that is less than the threshold, a lower command that lowers the lighting level by an amount that is less than the threshold, and/or a move-to-level command that adjusts the lighting level by an amount that is less than the threshold. The transmit power $P_2$ may be a lower transmit power than the transmit power $P_1$ and may conserve more power at the control device for transmissions. For example, the transmit power $P_2$ may be a minimum transmit power $P_{MIN}$ for transmitting message from the control device. Transmitting the message at the transmit power $P_2$ may conserve the finite power source of the control device performing the procedure 300. Though the procedure 300 shown in FIG. 3A shows two transmit powers for sending messages based on a threshold amount of change in the command type, messages may be transmitted using another number of transmit powers based on different command types. For example, three or more different command types may be defined with different thresholds based on different lighting intensity levels, or scenes, in the command being transmitted and a different transmit power may be used for the different lighting intensity levels, or scenes.

Figure 3B:
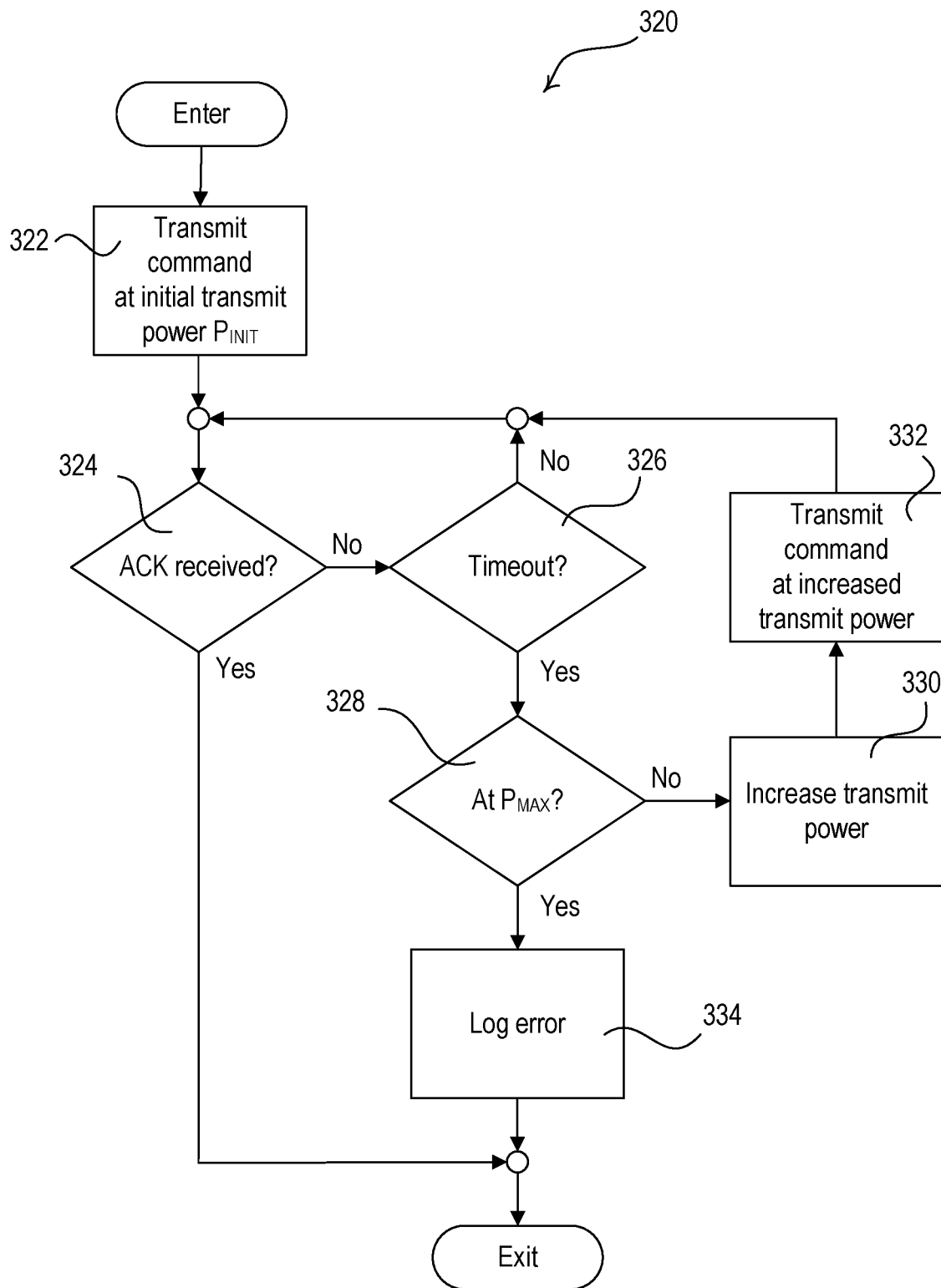

FIG. 3B is a flowchart depicting an example procedure 320 for transmitting messages from control devices in a load control system using an adaptive transmit power. The procedure 320 may be performed by a control device that is a power-conservative control device (e.g., powered by a finite power source, such as the remote control device 116, the motorized window treatment 130, the remote control device 150, the occupancy sensor 160, the daylight sensor 170, the network device 190, and/or the remote control device 202.

As described herein, the device may be configured to transmit commands in a manner such that the finite power source is conserved. The procedure 320 may be asynchronously performed, for example, in response to a user input (e.g., rotation of a rotation portion and/or actuation of an actuation portion) and may account for unknown message transmission conditions (e.g., account for changes in distance, interference, and/or channel conditions). For example, the procedure 320 may be performed by the remote control devices 116, 202 to transmit messages to a parent device or another device which may include commands for controlling one or more load control devices (e.g., the lighting devices 112a, 112b, 122, 204a, 204b). The parent device of a control device may be the system controller 180, 206, one of the lighting devices 112a, 112b, 122, 204a, 204b, or another control device in the load control system.

As shown in FIG. 3B, the control device may initially transmit a message that includes a command at an initial transmit power $P_{INIT}$ (e.g., a minimum transmit power $P_{MIN}$) in response to a triggering event. The triggering event may be an asynchronous event, such as a user input (e.g., rotation of a rotation portion and/or actuation of an actuation portion). For sensors, the triggering event may be triggered by sensor information (e.g., a threshold level of daylight for a daylight sensor, an occupancy or vacancy condition for an occupancy sensor, or another type of sensor information that may cause a triggering of a message). After transmitting the message at the initial transmit power $P_{INIT}$ (e.g., the minimum transmit power $P_{MIN}$) at 322, the control device may determine at 324 whether an acknowledgement message has been received at 324. If the acknowledgement message is received at 324, the procedure 320 may end. The acknowledgement message may indicate that the receiving device has received the command transmitted in the message and the message may be transmitted at a lower transmit power to conserve power at the control device.

If an acknowledgement message fails to be received at 324, the control device may determine whether a timeout has occurred at 326. The timeout may include a period of time for which the control device may wait to receive an acknowledgement message. If the timeout has failed to occur at 326, the control device may continue to await an acknowledgement message at 324. After the timeout (e.g., after a period of time since the transmission of the message at 360 elapses), the control device may determine at 328 whether the previously transmitted command was transmitted at a maximum transmit power $P_{MAX}$. If the transmit power of the previously transmitted message is not the maximum transmit power $P_{MAX}$, the transmit power may be increased at 330 and a message including the command may be transmitted at the increased transmit power at 332. As described herein, increasing the transmit power may increase the likelihood that a message is received. By initially transmitting the message at a lower transmit power, the control device may attempt to conserve power that may be used for transmitting messages. The control device may adapt the transmit power by increasing the transmit power in an attempt to receive an acknowledgement message that indicates the message has been received.

If the transmit power of the previously transmitted message is at the maximum transmit power $P_{MAX}$, an error condition may be logged at 334. The error condition logged at 334 may indicate that a command was not successfully received by the other device (e.g., parent device). The control device may transmit the error message to another device in the system (e.g., the parent device, the network device of a user, or another device). Though the FIG. 3B illustrates the procedure 320 with certain steps in a particular order, a control device may perform the steps, or a subset thereof, in other combinations or orders.

The control device may perform the procedure 320 for each message transmission in an attempt to minimize the transit power that is used to transmit messages from the control device. This procedure 320 may save on memory storage at the control device and/or allow the control device to transmit each message at a minimum transmit power for allowing receipt of the message. However, by starting at a minimum transmit power $P_{MIN}$ for each message transmission, the control device may incur latency that may cause delay in the receiving device being able to execute the command. Latency may be balanced with the conservation of battery power, as described herein.

Figure 3C:
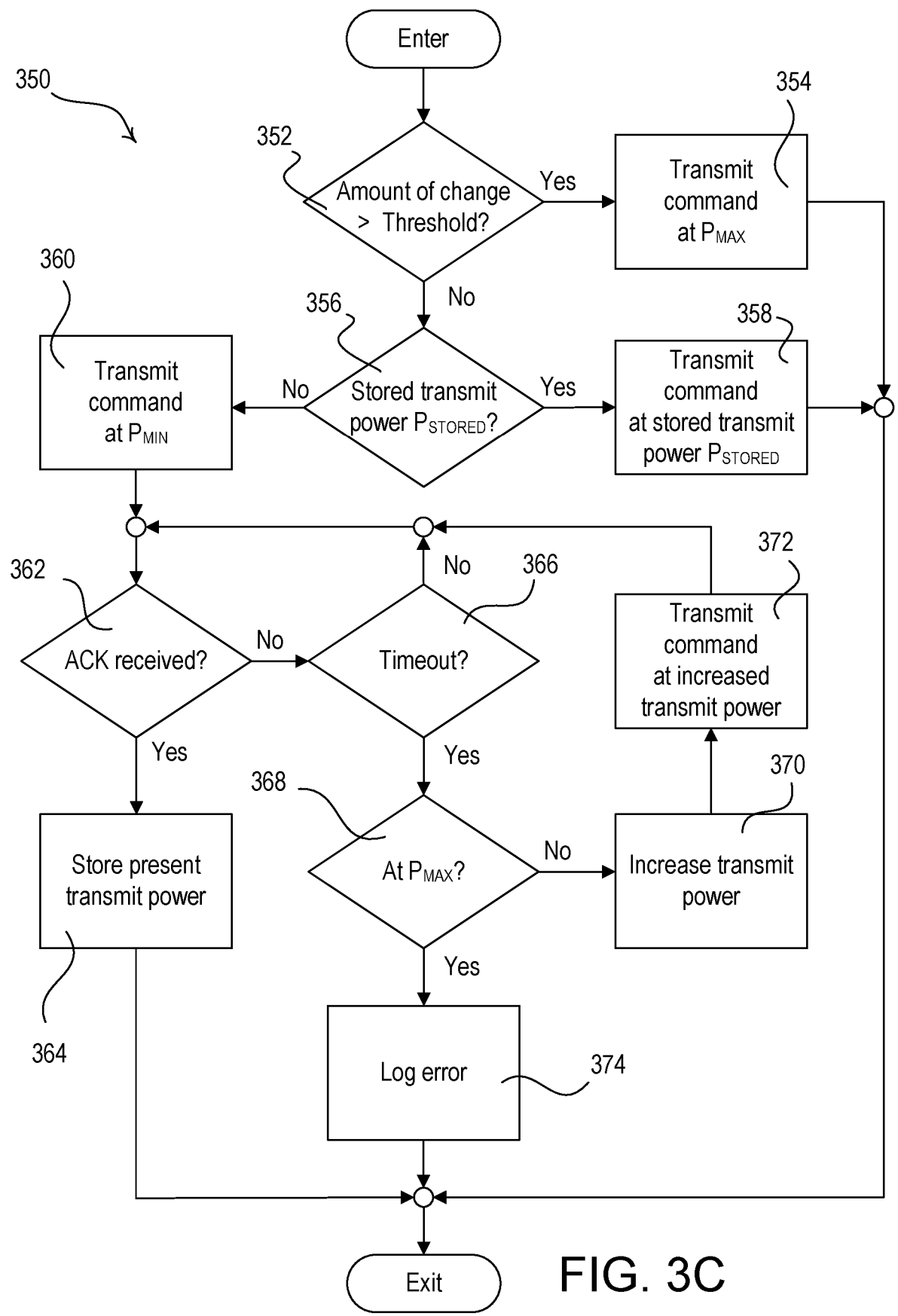

FIG. 3C is another flowchart depicting an example procedure 350 for transmitting messages from control devices in a load control system using an adaptive transmit power. The procedure 350 may be performed by a control device that is a power-conservative control device (e.g., powered by a finite power source, such as the remote control device 116 and/or the remote control device 202). As described herein, the device may be configured to transmit commands in a manner such that the finite power source is conserved. The procedure 350 may be asynchronously performed, for example, in response to a user input (e.g., rotation of a rotation portion and/or actuation of an actuation portion) and may account for unknown message transmission conditions (e.g., account for changes in distance, interference, and/or channel conditions). For example, the procedure 350 may be performed by the remote control devices 116, 202 to transmit messages to a parent device or another device which may include commands for controlling one or more load control devices (e.g., the lighting devices 112a, 112b, 122, 204a, 204b). The parent device of a control device may be the system controller 180, 206, one of the lighting devices 112a, 112b, 122, 204a, 204b, or another control device in the load control system.

At 352, the control device may determine if the command causes a change in the lighting level of a lighting device by an amount that is greater than a threshold. The determination may be based on the command type. For example, command types that change the lighting intensity levels by an amount that is greater than a threshold may include an on command, an off command, a toggle command, a raise command that raises the lighting level by an amount that is greater than the threshold, a lower command that lowers the lighting level by an amount that is greater than the threshold, and/or a move-to-level command that adjusts the lighting level by an amount that is greater than the threshold. As described herein, commands that change lighting intensity levels by an amount that is greater than the threshold may initially be transmitted at a transmit power that increases the likelihood that the message is received, such as, for example, a maximum transmit power $P_{MAX}$ of the control device. If the command is determined to change lighting intensity levels by an amount that is greater than the threshold, a message that includes the command may be transmitted at the maximum transmit power $P_{MAX}$ at 354, which may increase the likelihood that the command message is received after a single transmission. The maximum transmit power $P_{MAX}$ may be the maximum transmit power for a device, or a maximum transmit power for a series of messages transmitted over a period of time.

If, however, the command is determined to adjust lighting intensity levels by an amount less than (e.g., less than or equal to) the threshold, the control device may determine if the control device has previously stored a transmit power at which the control device successfully transmitted messages to another device, such as the parent device, (e.g., a stored transmit power $P_{STORED}$). If the control device has a stored transmit power $P_{STORED}$ at 356, the control device may transmit a message that includes the command at the stored transmit power $P_{STORED}$ at 358. If the control device does not have a stored transmit power $P_{STORED}$, the control device may transmit at 360 a message that includes the command at an initial transmit power, such as, for example, a minimum transmit power $P_{MIN}$ of the control device. Transmitting the message at the minimum transmit power may conserve the finite power source of the control device performing the procedure 350. The minimum transmit power $P_{MIN}$ may be the minimum transmit power for a device, or a minimum transmit power for a series of messages transmitted over a period of time.

At 362, the control device may determine if an acknowledgment message has been received, which may indicate whether the message including the command transmitted at 360 was received by the other device (e.g., parent device). If an acknowledgement message is received at 362, the present transmit power may be stored at 364. The transmit power stored at 364 (e.g., the stored transmit power $P_{STORED}$) may be used at subsequent invocations of the procedure 350 (e.g., at 358). The stored transmit power $P_{STORED}$ may be a transmit power that increases the likelihood that a message is received. If, at 362, an acknowledgement message is not received, the control device may determine if a timeout has occurred at 366. The timeout may include a period of time for which the control device may wait to receive an acknowledgement message. Further, after the timeout (e.g., after a period of time since the transmission of the message at 360 elapses), the control device may determine that the message was not received by the other device (e.g., parent device).

At 368, the control device may determine if the present transmit power is the maximum transmit power $P_{MAX}$. If the transmit power is not the maximum transmit power $P_{MAX}$, the transmit power may be increased at 370 and a message including the command may be transmitted at the increased transmit power at 372. As described herein, increasing the transmit power may increase the likelihood that a message is received. If, however, the transmit power of the command message is at the maximum transmit power $P_{MAX}$, an error condition may be logged at 374. The error condition logged at 374 may indicate that: a command was not successfully received by the other device (e.g., parent device), and/or the other device (e.g., parent device) is unable to receive communications from the control device performing the procedure 350. The control device may transmit the error message to another device in the system (e.g., the parent device, the network device of a user, or another device). At 374, the control device may return the transmit power to the originally stored transmit power $P_{STORED}$ and/or await an updated learning procedure or other configuration from another device in the system (e.g., the parent device, the network device of a user, or another device). Though the FIG. 3C illustrates the procedure 350 with certain steps in a particular order, a control device may perform the steps, or a subset thereof, in other combinations or orders.

After the control device has stored a transmit power for transmitting messages to other control devices (e.g., the parent device), the control device may update the stored transmit power $P_{STORED}$. For example, the control device may update the stored transmit power $P_{STORED}$ to mitigate battery usage at the control device and/or to increase the likelihood of successful communications in response to changes in network conditions (e.g., to account for changes in distance, interference, and/or channel conditions between the control device and the other control devices). The control device may update the stored transmit power $P_{STORED}$ during a learning procedure for learning the updated transmission power for transmitting messages.

Figure 4A:
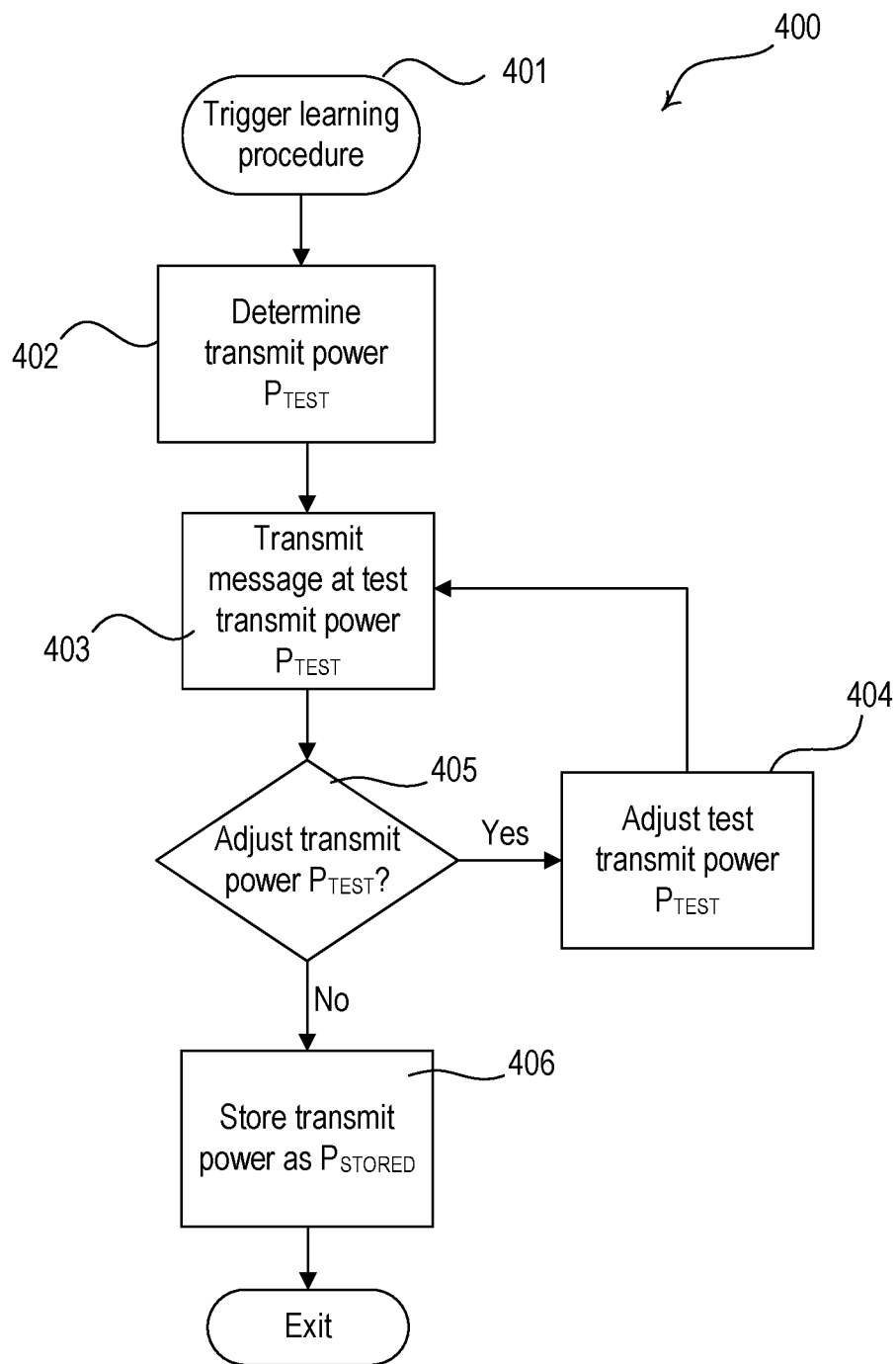
FIGS. 4A, 4B, and 4C are flowcharts depicting example procedures for learning a transmit power for communicating messages from control devices in a load control system.

FIG. 4A is a flowchart depicting an example procedure 400 for learning a transmit power for communicating messages from a control device in a load control system. The procedure 400 may be performed by a control device that is powered by a finite power source (e.g., the remote control device 116 and/or the remote control device 202). As described herein, the device may be configured to transmit messages in a manner such that the finite power source is conserved. The procedure 400 may be performed to implement a learning procedure for updating a stored transmit power $P_{STORED}$ at the control device. For example, the procedure 400 may be performed to allow the control device to learn a lower transmit power to reduce power usage at the control device, or to allow the control device to learn an increased transmit power for improving communications with other devices. The procedure 400 may be performed by the remote control devices 116, 202 to learn an updated transmit power for transmitting messages including commands for controlling one or more load control devices (e.g., the lighting devices 112a, 112b, 122, 204a, 204b).

At 401, the control device may trigger a learning procedure. The learning procedure may be triggered at 401 after a predefined period of time from a previous learning procedure, a previous storage of the stored transmit power $P_{STORED}$, or another triggering event for the period of time. The learning procedure may be triggered at 401 to allow the control device to update a previously stored transmit power $P_{STORED}$ for transmitting messages. The learning procedure may be triggered at 401 asynchronously, for example, in response to a user input (e.g., a user interaction, such as a rotation of a rotation portion and/or an actuation of an actuation portion) and may account for unknown message transmission conditions (e.g., account for changes in distance, interference, and/or channel conditions). For sensors, the triggering event may be triggered by sensor information (e.g., a threshold level of daylight for a daylight sensor, an occupancy or vacancy condition for an occupancy sensor, or another type of sensor information that may cause a triggering of a message). The learning procedure may be triggered at 401 in response to changes in distance, interference, and/or channel conditions on the network. For example, the control device may detect, at 401, changes in distance, interference, and/or channel conditions by detecting a failure of an acknowledgement message in response to one or more messages that have been transmitted to other devices at the stored transmit power $P_{STORED}$. Message communication conditions may be unknown and/or change over time. This may be a result of changes in the network and/or the environment, and/or the result of the control device being mobile (e.g., not fixed in a certain location). For example, the control device may be moved closer in proximity to a given load control device, which may improve message communication conditions and/or allow for control device to lower the transmit power of messages to another device (e.g., the parent device).

The control device may determine a test transmit power $P_{TEST}$ at 402. The test transmit power $P_{TEST}$ may be set to a defined transmit power for learning whether to adjust a transmit power for messages at the control device. The test transmit power $P_{TEST}$ may be set to a previously stored transmit power $P_{STORED}$ for determining whether the previously stored transmit power $P_{STORED}$ should be adjusted to enable a greater likelihood that messages are received at other devices (e.g., the parent device or other devices) or to improve on battery consumption when transmitting messages. The test transmit power $P_{TEST}$ may be set to another defined transmit power, and then increased or decreased to identify a transmit power at which messages are received at the other devices. For example, the test transmit power $P_{TEST}$ may be set to a maximum transmit power $P_{MAX}$ for transmitting messages from the control device and may be decreased. In another example, the test transmit power $P_{TEST}$ may be set to a minimum transmit power $P_{MIN}$ for transmitting messages from the control device and may be increased.

The test transmit power $P_{TEST}$ may be set to a different transmit power based on the command type being transmitted, as different command types may be transmitted at different power levels. For example, commands that change lighting intensity levels by an amount that is greater than a threshold may be transmitted at a transmit power $P_1$. Commands that change lighting intensity levels by an amount less than (e.g., less than or equal to) the threshold, may be transmitted at a transmit power $P_2$. Though two transmit powers are provided as example, additional transmit powers may be learned for different command types.

At 403, the control device may transmit a message using the test transmit power $P_{TEST}$. At 405, the control device may determine whether to adjust the test transmit power $P_{TEST}$. For example, if the control device receives an acknowledgement message in response to a message transmitted at the test transmit power $P_{TEST}$ (e.g., the maximum transmit power $P_{MAX}$, a relatively higher transmit power $P_1$, or a previously stored transmit power $P_{STORED}$ for testing), the control device may determine to adjust the test transmit power $P_{TEST}$ to a lower transmit power. If the control device fails to receive an acknowledgement message in response to the message transmitted at the test transmit power $P_{TEST}$ (e.g., the minimum transmit power $P_{MIN}$, a relatively lower transmit power $P_2$, or a previously stored transmit power $P_{STORED}$ for testing), the control device may determine to adjust the test transmit power $P_{TEST}$ to a higher transmit power.

The control device may adjust the test transmit power $P_{TEST}$ at 404. For example, the control device may lower the test transmit power $P_{TEST}$ until an acknowledgement message fails to be received before a timeout occurs. The control device may then store the transmit power of the device at 406 as the transmit power at which the last acknowledgement message was received. The control device may increase the test transmit power $P_{TEST}$ until an acknowledgement message is received before a timeout occurs. The control device may then store the transmit power of the device at 406 as the transmit power at which a first acknowledgement message is received. Adjusting the transmit power $P_{TEST}$ may allow the control device to learn a lower transmit power at which to transmit messages and allow the receiving devices to receive the messages, which may mitigate battery usage at the control device and/or to increase the likelihood of successful communications in response to changes in network conditions (e.g., to account for changes in distance, interference, and/or channel conditions between the control device and the other control devices).

The procedure 400, or portions thereof, may be performed one or more times to learn a transmit power for transmitting messages. For example, the control device may transmit a series of messages at the test transmit power $P_{TEST}$ (e.g., at 403) before adjusting the test transmit power. The control device may set the transmit power for transmitting messages based on an acknowledgement message being received a predefined number of times or a percentage of the time in response to the series of messages sent at the transmit power. The control device may also, or alternatively, compare the number of acknowledgement messages or the percentage of acknowledgement messages received at one transmit level with the number of acknowledgement messages or the percentage of acknowledgement messages received at another transmit level for selecting the transmit level at which future messages will be transmitted.

Figure 4B:
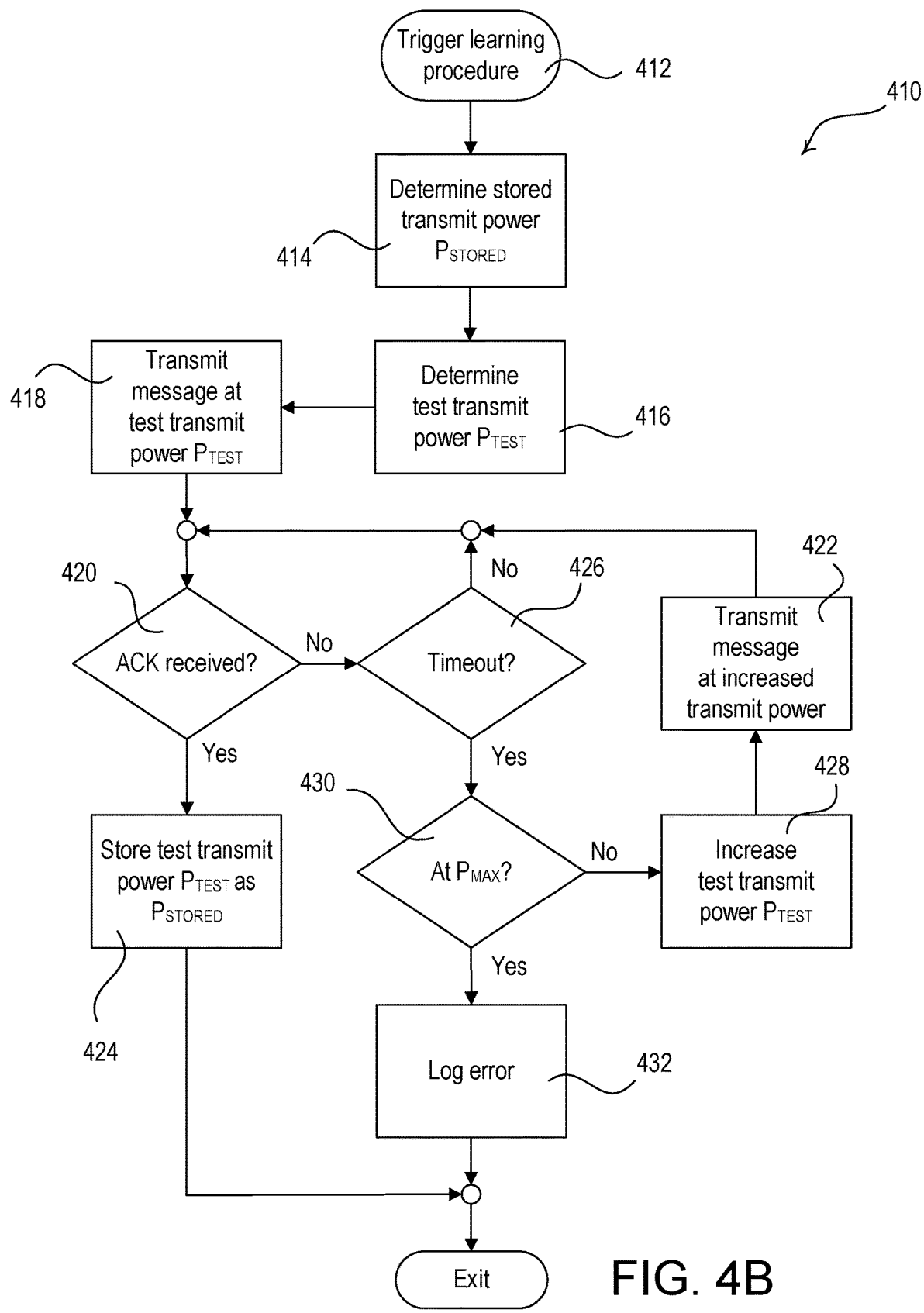

FIG. 4B is a flowchart depicting an example procedure 410 for learning a transmit power for communicating messages from a control devices in a load control system. The procedure 410 may be performed by a power-conservative control device (e.g., that is powered by a finite power source, such as the remote control device 116 and/or the remote control device 202). As described herein, the device may be configured to transmit messages in a manner such that the finite power source is conserved. The procedure 410 may be performed to implement a learning procedure for updating a stored transmit power $P_{STORED}$ at the control device. For example, the procedure 410 may be performed to allow the control device to learn a lower transmit power to reduce power usage at the control device, or to allow the control device to learn an increased transmit power for improving communications with other devices. The procedure 410 may be performed by the remote control devices 116, 202 to learn an updated transmit power for transmitting messages including commands for controlling one or more load control devices (e.g., the lighting devices 112a, 112b, 122, 204a, 204b).

At 412, the control device may trigger a learning procedure. The learning procedure may be triggered at 412 after a predefined period of time from the last time the procedure 400 was executed, the transmit power was last stored, or another defined event to allow the control device to update a previously stored transmit power $P_{STORED}$ for transmitting messages. The learning procedure may be triggered at 412 asynchronously, for example, in response to a user input (e.g., a user interaction, such as a rotation of a rotation portion and/or an actuation of an actuation portion) and may account for unknown message transmission conditions (e.g., account for changes in distance, interference, and/or channel conditions).

The learning procedure may be triggered at 412 in response to changes in distance, interference, and/or channel conditions on the network. For example, the control device may detect, at 412, changes in distance, interference, and/or channel conditions by detecting a failure of an acknowledgement message in response to one or more messages that have been transmitted to other devices at the stored transmit power $P_{STORED}$. The control device may also, or alternatively, sample the interference and/or channel conditions periodically to determine whether to trigger the learning procedure. Message communication conditions may be unknown and/or change over time. This may be a result of changes in the network and/or the environment, and/or the result of the control device being mobile (e.g., not fixed in a certain location). For example, the control device may be moved closer in proximity to a given load control device, which may improve message communication conditions and/or allow for control device to lower the transmit power of messages to another device (e.g., the parent device). The control device my identify changes in network information in received messages that indicate changes in link quality for communications or detect dropped messages from other devices (e.g., parent device or other devices) in the load control system that are to be transmitted periodically or in series to trigger the learning procedure at 412.

The learning procedure may be triggered at 412 to learn the transit power for messages that communicate certain types of commands. For example, the control device may trigger the learning procedure for learning the transmit power for commands that cause a change in the lighting level of a lighting device by an amount that is greater than a threshold, such that the control device may store the learned transmit power for being used for future commands that cause a similar change in the lighting level of a lighting device by the amount that is greater than the threshold. Commands that change the lighting intensity levels by an amount that is greater than a threshold may include an on command, an off command, a toggle command, a raise command that raises the lighting level by an amount that is greater than the threshold, a lower command that lowers the lighting level by an amount that is greater than the threshold, and/or a move-to-level command that adjusts the lighting level by an amount that is greater than the threshold. The control device may trigger the learning procedure for learning the transmit power for commands that cause a change in the lighting level of a lighting device by an amount that is less than a threshold, such that the control device may store the learned transmit power for being used for future commands that cause a similar change in the lighting level of a lighting device by the amount that is greater than the threshold.

At 414, the control device may determine the stored transmit power $P_{STORED}$ for transmitting messages (e.g., may be retrieved from memory). For example, the stored transmit power $P_{STORED}$ may be the transmit power previously stored during the procedure 350 illustrated in FIG. 3. At 416, the control device may determine a test transmit power $P_{TEST}$. The test transmit power $P_{TEST}$ may be a transmit power that is below the currently stored transmit power $P_{STORED}$ for transmitting messages from the control device. For example, the test transmit power $P_{TEST}$ may be less than the stored transmit power $P_{STORED}$ by a predetermined amount in an attempt to learn a reduced transmit power at which the control device may transmit messages (e.g., in response to changing network conditions that may be caused by changes in distance, interference, and/or channel conditions) and conserve the finite power source of the control device. The test transmit power $P_{TEST}$ may be a next lower transmit power than the currently stored transmit power $P_{STORED}$. The test transmit power $P_{TEST}$ may be equal to a minimum transmit power $P_{MIN}$, such that the control device may attempt to minimize its transmit power during the learning procedure.

The test transmit power $P_{TEST}$ may be a transmit power that is set at or above the currently stored transmit power $P_{STORED}$ for transmitting messages from the control device. For example, the test transmit power $P_{TEST}$ may be equal to the stored transmit power $P_{STORED}$ or greater than the stored transmit power $P_{STORED}$ by a predetermined amount in an attempt to learn an increased transmit power at which the control device may transmit messages (e.g., in response to changing network conditions that may be caused by changes in distance, interference, and/or channel conditions) to increase the likelihood that messages are received by other devices while attempting to mitigate power usage at the control device. The test transmit power $P_{TEST}$ may be a next higher transmit power than the currently stored transmit power $P_{STORED}$, if the test transmit power $P_{TEST}$ is above the stored transmit power $P_{STORED}$.

At 418, the control device may transmit a message using the test transmit power $P_{TEST}$. At 420, the control device may determine if an acknowledgment message has been received, which may indicate whether the message transmitted at 418 was received by another device (e.g., the parent device). If an acknowledgement message is received at 420, the test transmit power $P_{TEST}$ may be stored at 424. The test transmit power $P_{TEST}$ stored at 424 (e.g., the stored transmit power $P_{STORED}$) may be used at subsequent invocations of the procedure 350 (e.g., at 358) or the procedure 410 (e.g., at 414). The test transmit power $P_{TEST}$ may be a transmit power that increases the likelihood that a message is received and/or that allows for a decreased consumption of the control device's finite power source. If, at 420, an acknowledgement message is not received, the control device may determine if a timeout has occurred at 426. The timeout may include a period of time for which the control device may wait to receive an acknowledgement message. Further, after the timeout (e.g., after a period of time since the transmission of the message at 418 elapses), the control device may determine that the message was not received by the other device (e.g., the parent device).

At 430, the control device may determine if the test transmit power $P_{TEST}$ is a maximum transmit power $P_{MAX}$. If the test transmit power $P_{TEST}$ is not the maximum transmit power $P_{MAX}$, the test transmit power $P_{TEST}$ may be increased at 428 and a message may be transmitted at the increased transmit power at 422. As described herein, increasing the test transmit power $P_{TEST}$ may allow the control device to increase the likelihood that a message is received. If, however, the test transmit power $P_{TEST}$ of the message is at the maximum transmit power $P_{MAX}$ without receiving an acknowledgement message at 420, an error condition may be logged at 432. The error condition logged at 432 may indicate that: a message was not successfully received by the receiving device (e.g., the parent device), or the receiving device (e.g., the parent device) is unable to communicate receipt of the message to the control device performing the procedure 400.

Though the procedure 410 may use the maximum transmit power $P_{MAX}$ at 430 to which the test transmit power $P_{TEST}$ may be increased, the procedure 410 may be similarly implemented by increasing the learned transmit power to another maximum transmit power. For example, the control device may determine the stored transmit power $P_{STORED}$ at 414 and transmit a command at a lower test transmit power $P_{TEST}$. The test transmit power $P_{TEST}$ may be increased at 428 until the test transmit power $P_{TEST}$ reaches the previously stored transmit power $P_{STORED}$ (e.g., determined at 414). The procedure 410 may be performed in an attempt to reduce the previously stored transmit power $P_{STORED}$ and maintain the same transmit power if the control device fails to receive an acknowledgement message in response to the message transmitted at the lower transmit power.

Figure 4C:
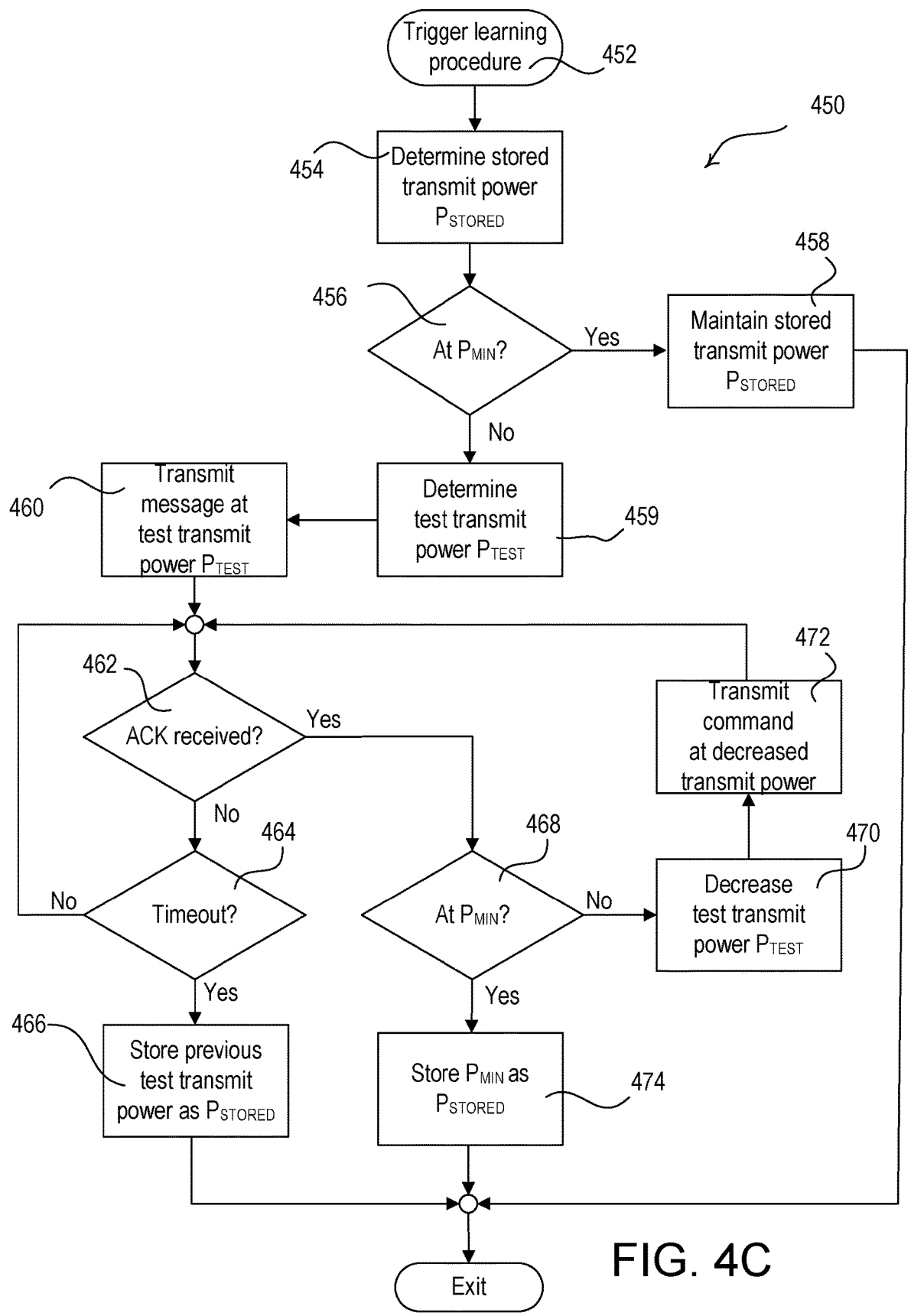

FIG. 4C is a flowchart depicting another example procedure 450 for learning a transmit power for communicating messages from control devices in a load control system. The procedure 450 may be performed by a power-conservative control device, such as a control device that is powered by a finite power source (e.g., the remote control device 116 and/or the remote control device 202). As described herein, the control device may be configured to transmit messages in a manner such that the finite power source is conserved. The procedure 450 may be performed to implement a learning procedure for updating a stored transmit power $P_{STORED}$ at the control device. For example, the procedure 450 may be performed to allow the control device to learn a lower transmit power to reduce power usage at the control device, while maintaining communications with other devices. The procedure 450 may be performed by the remote control devices 116, 202 to learn an updated transmit power for transmitting messages including commands for controlling one or more load control devices (e.g., the lighting devices 112a, 112b, 122, 204a, 204b).

At 452, the control device may trigger a learning procedure. The learning procedure may be triggered at 452 after a predefined period of time from the last time the procedure 450 was executed, the transmit power was last stored, or another defined event to allow the control device to update a previously stored transmit power $P_{STORED}$ for transmitting messages. The learning procedure may be triggered at 452 asynchronously, for example, in response to a user input (e.g., a user interaction, such as a rotation of a rotation portion and/or an actuation of an actuation portion) and may account for unknown message transmission conditions (e.g., account for changes in distance, interference, and/or channel conditions). For example, message communication conditions may be unknown and/or change over time. This may be a result of changes in the network and/or the environment, and/or the result of the control device being mobile (e.g., not fixed in a certain location). For example, the control device may be moved closer in proximity to another device (e.g., parent device), which may improve message communication conditions and/or allow for control device to lower the transmit power of message to the other device (e.g., the parent device).

The learning procedure may be triggered at 452 to learn the transit power for messages that communicate certain types of commands. For example, the control device may trigger the learning procedure for learning the transmit power for commands that cause a change in the lighting level of a lighting device by an amount that is greater than a threshold, such that the control device may store the learned transmit power for being used for future commands that cause a similar change in the lighting level of a lighting device by the amount that is greater than the threshold. Commands that change the lighting intensity levels by an amount that is greater than a threshold may include an on command, an off command, a toggle command, a raise command that raises the lighting level by an amount that is greater than the threshold, a lower command that lowers the lighting level by an amount that is greater than the threshold, and/or a move-to-level command that adjusts the lighting level by an amount that is greater than the threshold. The control device may trigger the learning procedure for learning the transmit power for commands that cause a change in the lighting level of a lighting device by an amount that is less than a threshold, such that the control device may store the learned transmit power for being used for future commands that cause a similar change in the lighting level of a lighting device by the amount that is greater than the threshold.

At 454, the control device may determine the stored transmit power $P_{STORED}$ for transmitting messages (e.g., may be retrieved from memory). For example, the stored transmit power $P_{STORED}$ may be the transmit power previously stored using during the procedure 350 illustrated in FIG. 3. The control device may determine, at 456, whether the stored transmit power $P_{STORED}$ at 454 is already at a minimum transmit power $P_{MIN}$. If the stored transmit power $P_{STORED}$ is equal to $P_{MIN}$, the control device may maintain the stored transmit power $P_{STORED}$ at 458.

If the stored transmit power $P_{STORED}$ is greater than the minimum transmit power $P_{MIN}$, the control device may determine a test transmit power $P_{TEST}$ at 459. The test transmit power $P_{TEST}$ may be a transmit power that a next lower transmit power than the stored transmit power $P_{STORED}$. For example, the test transmit power $P_{TEST}$ may be less than the stored transmit power $P_{STORED}$ by a predetermined amount in an attempt to learn a reduced transmit power at which the control device may transmit messages (e.g., in response to changing network conditions that may be caused by changes in distance, interference, and/or channel conditions) and conserve battery power at the control device.

At 460, the control device may transmit a message using the test transmit power $P_{TEST}$. At 462, the control device may determine if an acknowledgment message has been received, which may indicate whether the message transmitted at 460 was received by another device (e.g., the parent device). If an acknowledgement message is received at 462, the control device may determine whether the test transmit power $P_{TEST}$ is equal to the minimum transmit power $P_{MIN}$. If the test transmit power $P_{TEST}$ is not equal to the minimum transmit power $P_{MIN}$, the control device may decrease the test transmit power $P_{TEST}$ at 470 in an attempt to determine whether to further reduce the stored transmit power $P_{STORED}$. The control device may transmit the message at the decreased transmit power at 472. The control device may again determine whether an acknowledgement message was received in response to the message transmitted at the decreased transmit power at 462. If it is determined that the learned transmit power $P_{LEARN}$ is equal to the minimum transmit power $P_{MIN}$, the control device may store the minimum transmit power $P_{MIN}$ as the stored transmit power $P_{STORED}$ for transmitting messages from the control device.

If, at 462, an acknowledgement message is not received, the control device may determine if a timeout has occurred at 464. The timeout may include a period of time for which the control device may wait to receive an acknowledgement message. Further, after the timeout (e.g., after a period of time since the transmission of the message at 460 elapses), the control device may determine that the message was not received by the other device (e.g., parent device).

If an acknowledgement message fails to be received at the test transmit power $P_{TEST}$, the control device may store the previous transmit power at 466. The previous transmit power may be the previous transmit power at which a message was transmitted (e.g., at 472) and an acknowledgement message was received (e.g., at 462). The previous transmit power may be the previous iteration of the test transmit power $P_{TEST}$. If the control device did not receive an acknowledgement message in response to transmitting the message at the test transmit power $P_{TEST}$ (e.g., the initial value of the test transmit power used at 460), the previous transmit power may be the stored transmit power $P_{STORED}$ (e.g., as determined at 454). As described herein, decreasing the test transmit power $P_{TEST}$ to learn a new stored transmit power $P_{STORED}$ may allow the control device to reduce the power usage for transmitting messages from the control device, while maintaining communication with other devices (e.g., the parent device) on the network.

Though the step in FIGS. 4A, 4B, 4C are illustrated in a particular order, a control device may perform the steps, or a subset thereof, in any combination or order.

Figure 5:
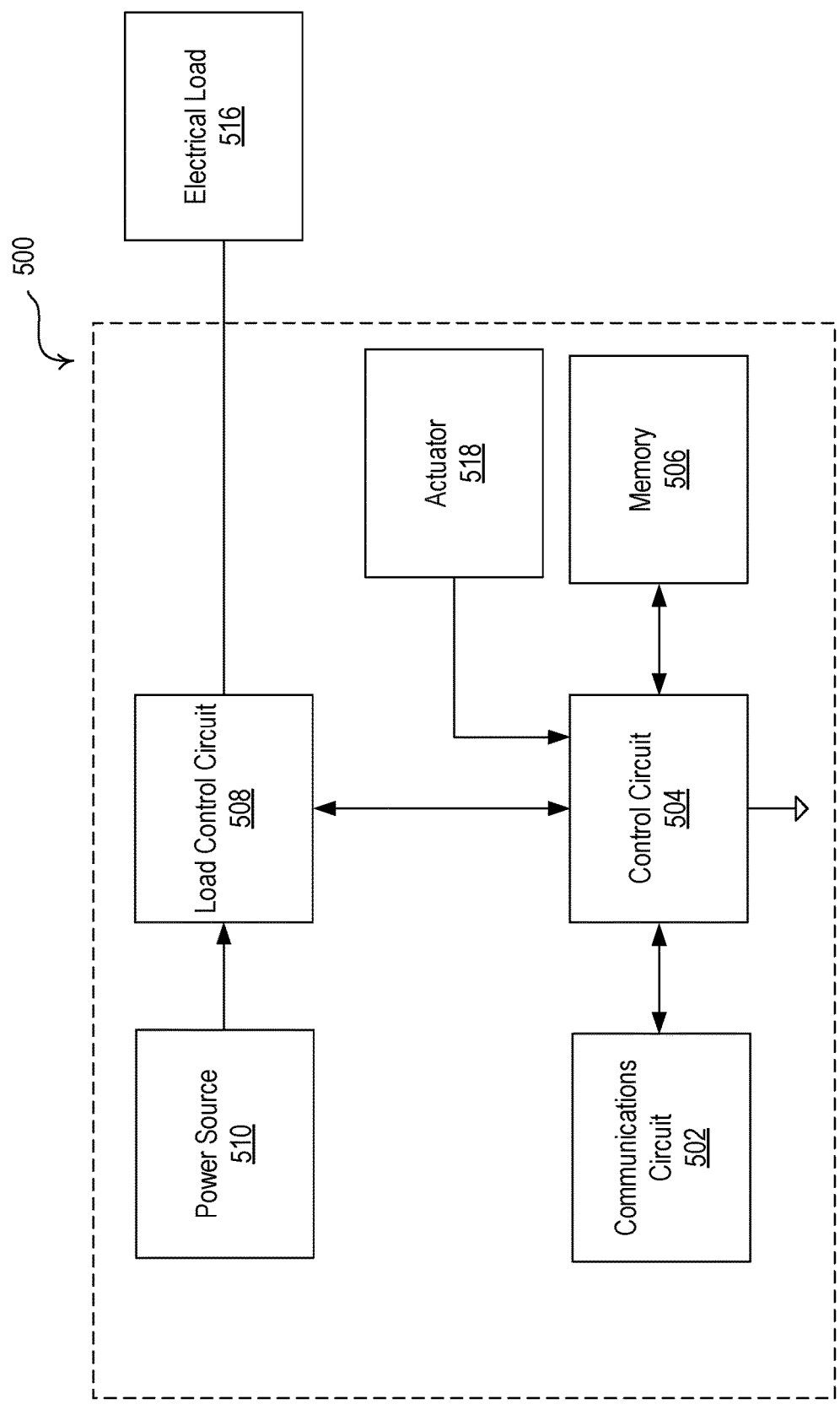
FIG. 5 is a block diagram of an example load control device.

FIG. 5 is a block diagram illustrating an example load control device, e.g., a load control device 500, as described herein. The load control device may comprise a load control circuit 508 for controlling an electrical load 516. The load control device 500 may be a dimmer switch, an electronic switch, a lighting device (e.g., a light bulb, an electronic ballast for lamps, an LED driver for LED light sources, etc.), an AC plug-in load control device for controlling a plugged electrical load, a controllable electrical receptacle, a temperature control device (e.g., a thermostat), a motor drive unit for a motorized window treatment, a motor drive unit for a fan (e.g., ceiling fan), an audio device (e.g., a controllable speaker or playback device), an appliance, a security camera device, or other load control device.

The load control device 500 may comprise a power source 510 for powering the circuitry of the load control device and/or the electrical load 516. For example, the power source 510 may comprise a power converter and/or a power supply configured to receive a source voltage from an external power source (e.g., an AC mains line voltage power source and/or an external DC power supply) and generate a supply voltage (e.g., a DC supply voltage). In addition, the power source 510 may comprise a battery for powering the circuitry of the load control device 500 and/or the electrical load 516. The load control circuit 508 may receive the supply voltage from the power source 510 and may control an amount of power delivered to the electrical load 516.

The load control device 500 may include a communications circuit 502. The communications circuit 502 may include a receiver, an RF transceiver, or other communications module capable of performing wired and/or wireless communications via communications link 510. The communications circuit 502 may be in communication with a control circuit 504. The control circuit 504 may include one or more general purpose processors, special purpose processors, conventional processors, digital signal processors (DSPs), microprocessors, integrated circuits, a programmable logic device (PLD), application specific integrated circuits (ASICs), or the like. The control circuit 504 may perform signal coding, data processing, power control, input/output processing, or any other functionality that enables the load control device 500 to perform as described herein.

The control circuit 504 may be coupled to the communication circuit 502 for transmitting and receiving messages (e.g., digital messages) via the communication circuit. The control circuit 504 may be configured to control the transmit power of the communication circuit 502 to allow the load control device 500 to be characterized by an adaptive transmit power (e.g., as described herein). The control circuit 504 may cause the communication circuit 502 to initially transmit a message at a low transmit power and then increase the transmit power until the message is received by an intended recipient. The control circuit 504 may also dynamically adjust the transmit power based on the type of message and/or the type of command being transmitted.

The control circuit 504 may store information in and/or retrieve information from the memory 506. For example, the memory 506 may maintain a registry of associated control devices and/or control configuration instructions. The memory 506 may include a non-removable memory and/or a removable memory. The load control circuit 508 may receive instructions from the control circuit 504 and may control the electrical load 516 based on the received instructions. The load control circuit 508 may send status feedback to the control circuit 504 regarding the status of the electrical load 516. The load control circuit 508 may receive power via the hot connection 512 and the neutral connection 514 and may provide an amount of power to the electrical load 516. The electrical load 516 may include any type of electrical load.

The control circuit 504 may be in communication with an actuator 518 (e.g., one or more buttons) that may be actuated by a user to communicate user selections to the control circuit 504. For example, the actuator 518 may be actuated to put the control circuit 504 in an association mode and/or communicate association messages from the load control device 500.

Figure 6:
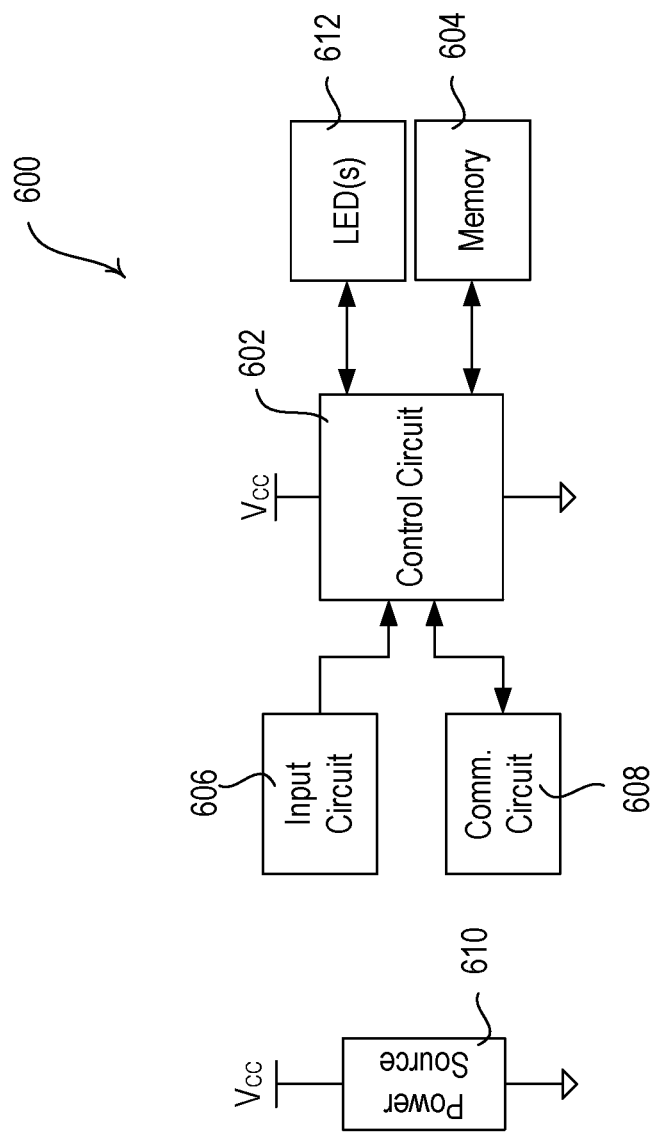
FIG. 6 is a block diagram of an example controller device.

FIG. 6 is a block diagram illustrating an example controller device 600 as described herein. The controller device 600 may be a remote control device, an occupancy sensor, a daylight sensor, a window sensor, a temperature sensor, and/or the like. The controller device 600 may include a control circuit 602 for controlling the functionality of the controller device 600. The control circuit 602 may include one or more general purpose processors, special purpose processors, conventional processors, digital signal processors (DSPs), microprocessors, integrated circuits, a programmable logic device (PLD), application specific integrated circuits (ASICs), or the like. The control circuit 602 may perform signal coding, data processing, power control, input/output processing, and/or any other functionality that enables the controller device 600 to perform as described herein.

The control circuit 602 may store information in and/or retrieve information from the memory 604. The memory 604 may include a non-removable memory and/or a removable memory, as described herein.

The controller device 600 may include one or more light sources, such as one or more LEDs 612, for providing feedback to a user. The one or more LEDs 612 may be included in a status indicator and may be controlled by the control circuit 602. The control circuit 602 may control the LEDs 612 as described herein to provide feedback to the user.

The control circuit 602 may also be in communication with an input circuit 606. The input circuit 606 may include an actuator (e.g., one or more buttons), a rotating or sliding portion, or a sensor circuit (e.g., an occupancy sensor circuit, a daylight sensor circuit, or a temperature sensor circuit) for receiving input that may be sent to a device for controlling an electrical load. The input circuit 606 may also comprise a proximity sensing circuit for sensing an occupant in the vicinity of the controller device 600. For example, the controller device 602 may receive input from the input circuit 606 to put the control circuit 602 in an association mode and/or communicate association messages from the controller device 600. The control circuit 602 may receive information from the input circuit 606 (e.g., an indication that a button has been actuated, a rotation portion has been rotated, or information has been sensed) and/or an indication of a proximity sensing event. The input circuit 606 may be actuated as an on/off event. Each of the modules within the controller device 600 may be powered by a power source 610.

The controller device 600 may include a wireless communications circuit 608 for transmitting and/or receiving information. The wireless communications circuit 608 may transmit and/or receive information via wireless communications. The wireless communications circuit 608 may include a transmitter, an RF transceiver, or other circuit capable of performing wired and/or wireless communications. The wireless communications circuit 608 may be in communication with control circuit 602 for transmitting and/or receiving information.

The control circuit 602 may be coupled to the wireless communication circuit 608 for transmitting and receiving messages (e.g., digital messages) via the wireless communication circuit 608. The control circuit 602 may be configured to control the transmit power of the wireless communication circuit 608 to allow the controller device 600 to be characterized by an adaptive transmit power (e.g., as described herein). The control circuit 602 may cause the wireless communication circuit 608 to initially transmit a message at a low transmit power and then increase the transmit power until the message is received by an intended recipient. The control circuit 602 may also dynamically adjust the transmit power based on the type of message (e.g., unicast messages or multicast messages) and/or the type of command (e.g., on, off, move-to-level, move-with-fade, etc.) being transmitted.

Figure 7:
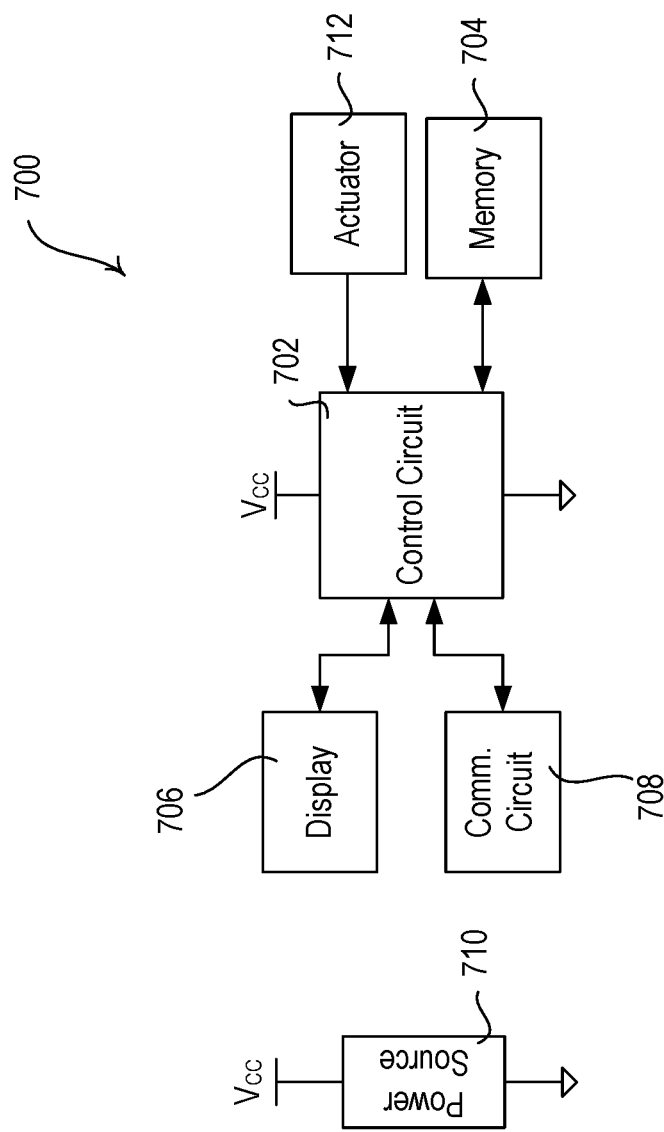
FIG. 7 is a block diagram of an example network device.

FIG. 7 is a block diagram illustrating an example network device 700 as described herein. The network device 700 may include the network device 190, for example. The network device 700 may include a control circuit 702 for controlling the functionality of the network device 700. The control circuit 702 may include one or more general purpose processors, special purpose processors, conventional processors, digital signal processors (DSPs), microprocessors, integrated circuits, a programmable logic device (PLD), application specific integrated circuits (ASICs), or the like. The control circuit 702 may perform signal coding, data processing, power control, input/output processing, or any other functionality that enables the network device 700 to perform as described herein. The control circuit 702 may store information in and/or retrieve information from the memory 704. The memory 704 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 700 may include a communications circuit 708 for transmitting and/or receiving information. The communications circuit 708 may perform wireless and/or wired communications. The communications circuit 708 may include an RF transceiver or other circuit capable of performing wireless communications via an antenna. Communications circuit 708 may be in communication with control circuit 702 for transmitting and/or receiving information.

The control circuit 702 may also be in communication with a display 706 for providing information to a user. The control circuit 702 and/or the display 706 may generate GUIs for being displayed on the network device 700. The display 706 and the control circuit 702 may be in two-way communication, as the display 706 may include a touch screen module capable of receiving information from a user and providing such information to the control circuit 702. The network device may also include an actuator 712 (e.g., one or more buttons) that may be actuated by a user to communicate user selections to the control circuit 702.

Each of the modules within the network device 700 may be powered by a power source 710. The power source 710 may include an AC power supply or DC power supply, for example. The power source 710 may generate a supply voltage $V_{CC}$ for powering the modules within the network device 700.

Figure 8:
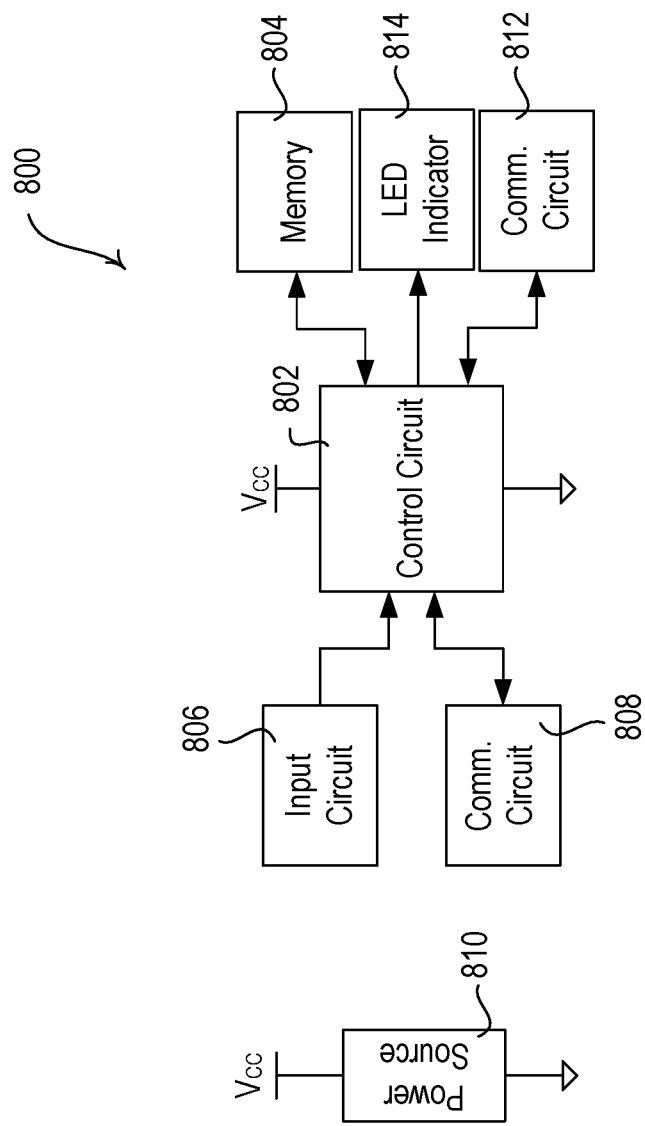
FIG. 8 is a block diagram of an example system controller.

FIG. 8 is a block diagram illustrating an example system controller 800 (e.g., the system controller 180) as described herein. The system controller 800 may include a control circuit 802 for controlling the functionality of the system controller 800. The control circuit 802 may include one or more general purpose processors, special purpose processors, conventional processors, digital signal processors (DSPs), microprocessors, integrated circuits, a programmable logic device (PLD), application specific integrated circuits (ASICs), or the like. The control circuit 802 may perform signal coding, data processing, power control, input/output processing, or any other functionality that enables the system controller 800 to perform as described herein. The control circuit 802 may store information in and/or retrieve information from the memory 804. The memory 804 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 800 may include a communications circuit 808 for transmitting and/or receiving information. The communications circuit 808 may perform wireless and/or wired communications. The system controller 800 may also, or alternatively, include a communications circuit 812 for transmitting and/or receiving information. The communications circuit 812 may perform wireless and/or wired communications. Communications circuits 808 and 812 may be in communication with control circuit 802. The communications circuits 808 and 812 may include RF transceivers or other communications modules capable of performing wireless communications via an antenna. The communications circuit 808 and communications circuit 812 may be capable of performing communications via the same communication channels or different communication channels. For example, the communications circuit 808 may be capable of communicating (e.g., with a network device, over a network, etc.) via a wireless communication channel (e.g., BLUETOOTH®, NFC, WI-FI®, THREAD®, BLE, ZIGBEE, WIMAX®, cellular, etc.) and the communications circuit 812 may be capable of communicating (e.g., with control devices and/or other devices in the load control system) via another wireless communication channel (e.g., WI-FI®, BLUETOOTH, ZIGBEE, NFC, BLE, THREAD®, or a proprietary communication channel, such as CLEAR CONNECT™ or CLEAR CONNECT TYPE X™).

The control circuit 802 may be in communication with an LED indicator 814 for providing indications to a user. The control circuit 802 may be in communication with an actuator 806 (e.g., one or more buttons) that may be actuated by a user to communicate user selections to the control circuit 802. For example, the actuator 806 may be actuated to put the control circuit 802 in an association mode and/or communicate association messages from the system controller 800.

Each of the modules within the system controller 800 may be powered by a power source 810. The power source 810 may include an AC power supply or DC power supply, for example. The power source 810 may generate a supply voltage $V_{CC}$ for powering the modules within the system controller 800.

Although features and elements are described herein in particular combinations, each feature or element can be used alone or in any combination with the other features and elements. For example, the functionality described herein may be described as being performed by a control device, such as a remote control device or a lighting device, but may be similarly performed by a system controller or a network device. The procedures and methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A remote control device, comprising:
   a battery;
   a user interface;
   a wireless communications circuit; and
   a processor configured to:
   receive a user input via the user interface;
   determine a lighting control command of a plurality of lighting control command types for transmission in a message configured to control a lighting load based on the user input, wherein the plurality of lighting control command types comprise a lighting control command configured to turn a lighting load on, a lighting control command configured to turn a lighting load off, or a lighting control command configured to adjust a lighting level of the lighting load;
   determine, based on the determined lighting control command configured to control the lighting load, a selected transmit power of a plurality of transmit powers for transmitting the message; and
   transmit the message at the selected transmit power via the wireless communications circuit.

2. The remote control device of claim 1, wherein the selected transmit power is a first transmit power of the plurality of transmit powers, and wherein the processor is further configured to:
   determine a second transmit power of the plurality of transmit powers on a condition that the message failed to be successfully received, wherein the second transmit power is greater than the first transmit power; and
   retransmit the message at the second transmit power.

3. The remote control device of claim 1, wherein the processor is further configured to determine that the message failed to be successfully received based on a failure to receive an acknowledgement message within a period of time from when the message was transmitted.

4. The remote control device of claim 2, wherein the processor is further configured to:
   receive an acknowledgement message in response to the retransmission of the message at the second transmit power; and
   store the second transmit power as a stored transmit power for transmitting other messages after receipt of the acknowledgement message.

5. The remote control device of claim 4, wherein the processor is further configured to:
   receive another user input via the user interface;
   determine another lighting control command of the plurality of lighting control command types based on the other user input; and
   transmit a second message including the other lighting control command at the stored transmit power after receipt of the other user input.

6. The remote control device of claim 1, wherein the processor is further configured to:
   determine a change in lighting level of the lighting load based on the lighting control command; and
   when the change in lighting level is greater than a threshold amount, transmit the message at a maximum transmit power.

7. The remote control device of claim 1, wherein the selected transmit power is a first transmit power of the plurality of transmit powers when the lighting control command is a lighting control command configured to turn a lighting load on or a lighting control command configured to turn a lighting load off, and wherein the processor is further configured to transmit the message at a second transmit power when the lighting control command is a lighting control command configured to adjust the lighting level of the lighting load.

8. The remote control device of claim 7, wherein the first transmit power is higher than the second transmit power.

9. The remote control device of claim 1, wherein the processor is further configured to:
   determine an amount of adjustment that the determined lighting control command is configured to cause at the lighting load, wherein the selected transmit power is determined to be higher in response to the amount of adjustment being greater than a threshold, and wherein the selected transmit power is lower in response to the amount of adjustment being less than or equal to the threshold.

10. A method, comprising:
    receiving a user input;
    determining a lighting control command of a plurality of lighting control command types for transmission in a message configured to control a lighting load based on the user input, wherein the plurality of lighting control command types comprise a lighting control command configured to turn a lighting load on, a lighting control command configured to turn a lighting load off, or a lighting control command configured to adjust a lighting level of the lighting load;
    determining, based on the determined lighting control command, a selected transmit power of a plurality of transmit powers for transmitting the message; and
    transmitting the message at the selected transmit power.

11. The method of claim 10, wherein the selected transmit power is a first transmit power of the plurality of transmit powers, and wherein the method further comprises:
    determining a second transmit power of the plurality of transmit powers on a condition that the message failed to be successfully received, wherein the second transmit power is greater than the first transmit power; and
    retransmitting the message at the second transmit power.

12. The method of claim 10, further comprising determining that the message failed to be successfully received based on a failure to receive an acknowledgement message within a period of time from when the message was transmitted.

13. The method of claim 11, further comprising:
    receiving an acknowledgement message in response to the retransmission of the message at the second transmit power; and
    storing the second transmit power as a stored transmit power for transmitting other messages after receipt of the acknowledgement message.

14. The method of claim 13, further comprising:
    receiving another user input via a user interface;
    determining another lighting control command of the plurality of lighting control command types based on the other user input; and transmitting a second message including the other lighting control command at the stored transmit power after receipt of the other user input.

15. The method of claim 10, further comprising:
determining a change in lighting level of the lighting load based on the lighting control command; and
when the change in lighting level is greater than a threshold amount, setting the selected transmit power to a maximum transmit power.

16. The method of claim 10,
wherein the selected transmit power is a first transmit power of the plurality of transmit powers when the lighting control command is a lighting control command configured to turn a lighting load on or a lighting control command configured to turn a lighting load off; and wherein the method comprises:
transmitting the message at a second transmit power when the lighting control command is a lighting control command configured to adjust the lighting level of the lighting load.

17. The method of claim 16, wherein the first transmit power is higher than the second transmit power.

18. The method of claim 10, further comprising:
determining an amount of adjustment that the determined lighting control command is configured to cause at the lighting load, wherein the selected transmit power is determined to be higher in response to the amount of adjustment being greater than a threshold, and wherein the selected transmit power is lower in response to the amount of adjustment being less than or equal to the threshold.

19. A non-transitory computer-readable storage medium having computer executable instructions stored thereon that, when executed by a control circuit, cause the control circuit to:
receive a user input via a user interface;
determine a lighting control command of a plurality of lighting control command types for transmission in a message configured to control a lighting load based on the user input, wherein the plurality of lighting control command types comprise a lighting control command configured to turn a lighting load on, a lighting control command configured to turn a lighting load off, or a lighting control command configured to adjust a lighting level of the lighting load;
determine, based on the determined lighting control command, a selected transmit power of a plurality of transmit powers for transmitting the message; and
transmit the message at the selected transmit power.

20. The non-transitory computer-readable storage medium of claim 19, wherein the selected transmit power is a first transmit power of the plurality of transmit powers, and wherein the instructions, when executed, further cause the control circuit to:
determine a second transmit power of the plurality of transmit powers on a condition that the message failed to be successfully received, wherein the second transmit power is greater than the first transmit power; and
retransmit the message at the second transmit power.

* * * * *